(12) United States Patent
Basil et al.

(10) Patent No.: US 9,473,421 B1
(45) Date of Patent: Oct. 18, 2016

(54) MODULAR COMPUTER SYSTEM AND METHOD

(71) Applicant: Fourth Cloud, Inc., Norfolk, VA (US)

(72) Inventors: Keith McKinley Basil, Norfolk, VA (US); Rhys David Oxenham, Cardiff (GB); Mark Imbriaco, West Forest, NC (US)

(73) Assignee: Fourth Cloud, Inc., Norfolk, VA (US)

( * ) Notice: Subject to any disclaimer, the term of this patent is extended or adjusted under 35 U.S.C. 154(b) by 4 days.

(21) Appl. No.: 14/819,894

(22) Filed: Aug. 6, 2015

Related U.S. Application Data

(60) Provisional application No. 62/034,018, filed on Aug. 6, 2014.

(51) Int. Cl.
*G06F 12/08* (2016.01)
*H04L 12/911* (2013.01)
*H04L 29/12* (2006.01)
*G06F 17/30* (2006.01)

(52) U.S. Cl.
CPC ....... *H04L 47/821* (2013.01); *G06F 17/30876* (2013.01); *H04L 61/6022* (2013.01)

(58) Field of Classification Search
CPC .. G06F 9/5077; G06F 3/0665; G06F 3/0667; G06F 2212/152; G06F 2212/2532; G06F 2212/261; G06F 2212/262; G06F 2212/263; G06F 3/067; G06F 17/302; G06F 17/30876; H04L 47/821; H04L 61/6022
USPC .................................. 709/215, 223, 227–229
See application file for complete search history.

(56) References Cited

U.S. PATENT DOCUMENTS

| | | |
|---|---|---|
| 5,227,957 A | 7/1993 | Deters |
| 5,602,721 A | 2/1997 | Slade et al. |

(Continued)

OTHER PUBLICATIONS

J. Chalopin et al., "Enumeration and Leader Election in Partially Anonymous Multi-hop Broadcast Networks" Fundamenta Informaticae 119 (2012) 1-27 DOI 10.3233/FI-2012-670, IOS Press.

*Primary Examiner* — Kenneth R Coulter
(74) *Attorney, Agent, or Firm* — Kevin Keener; Keener and Associates, P.C.

(57) ABSTRACT

The invention is a modular computing system and method of use. The invention includes a chassis used for structurally supporting a plurality of computer resource modules. The chassis provides a power source and connection point for the computer resource modules. The computer resource modules segment and replicate user information to provide redundancy of information in the case of failure. The computer resource modules elect a lead computer resource module to handle the organization of the computer resource modules during use. The computer resource modules provide a hierarchy of leadership in case the lead resource module fails. The operating software provides floating application storage which can persist across the multiple computer resource modules after the application is closed. The application can access the floating application storage when it is reopened.

20 Claims, 42 Drawing Sheets

(56) References Cited

U.S. PATENT DOCUMENTS

| | | | | |
|---|---|---|---|---|
| 7,620,775 B1* | 11/2009 | Waxman | G06F 3/0626 | 709/218 |
| 9,015,426 B2* | 4/2015 | Stabrawa | G06F 3/0611 | 711/154 |
| 9,020,697 B2* | 4/2015 | Ricci | H04W 48/04 | 701/36 |
| 9,082,238 B2* | 7/2015 | Ricci | H04W 48/04 | |
| 9,082,239 B2* | 7/2015 | Ricci | H04W 48/04 | |
| 9,123,186 B2* | 9/2015 | Ricci | H04W 48/04 | |
| 9,142,072 B2* | 9/2015 | Ricci | H04W 48/04 | |
| 2009/0204805 A1* | 8/2009 | Robba | H04W 12/02 | 713/153 |
| 2012/0210095 A1* | 8/2012 | Nellans | G06F 12/1072 | 711/206 |
| 2012/0221803 A1* | 8/2012 | Stabrawa | G06F 3/0611 | 711/154 |
| 2014/0309880 A1* | 10/2014 | Ricci | H04W 48/04 | 701/36 |
| 2014/0309886 A1* | 10/2014 | Ricci | H04W 48/04 | 701/41 |
| 2014/0310739 A1* | 10/2014 | Ricci | H04W 48/04 | 725/28 |
| 2015/0232065 A1* | 8/2015 | Ricci | B60R 25/01 | 701/36 |

* cited by examiner

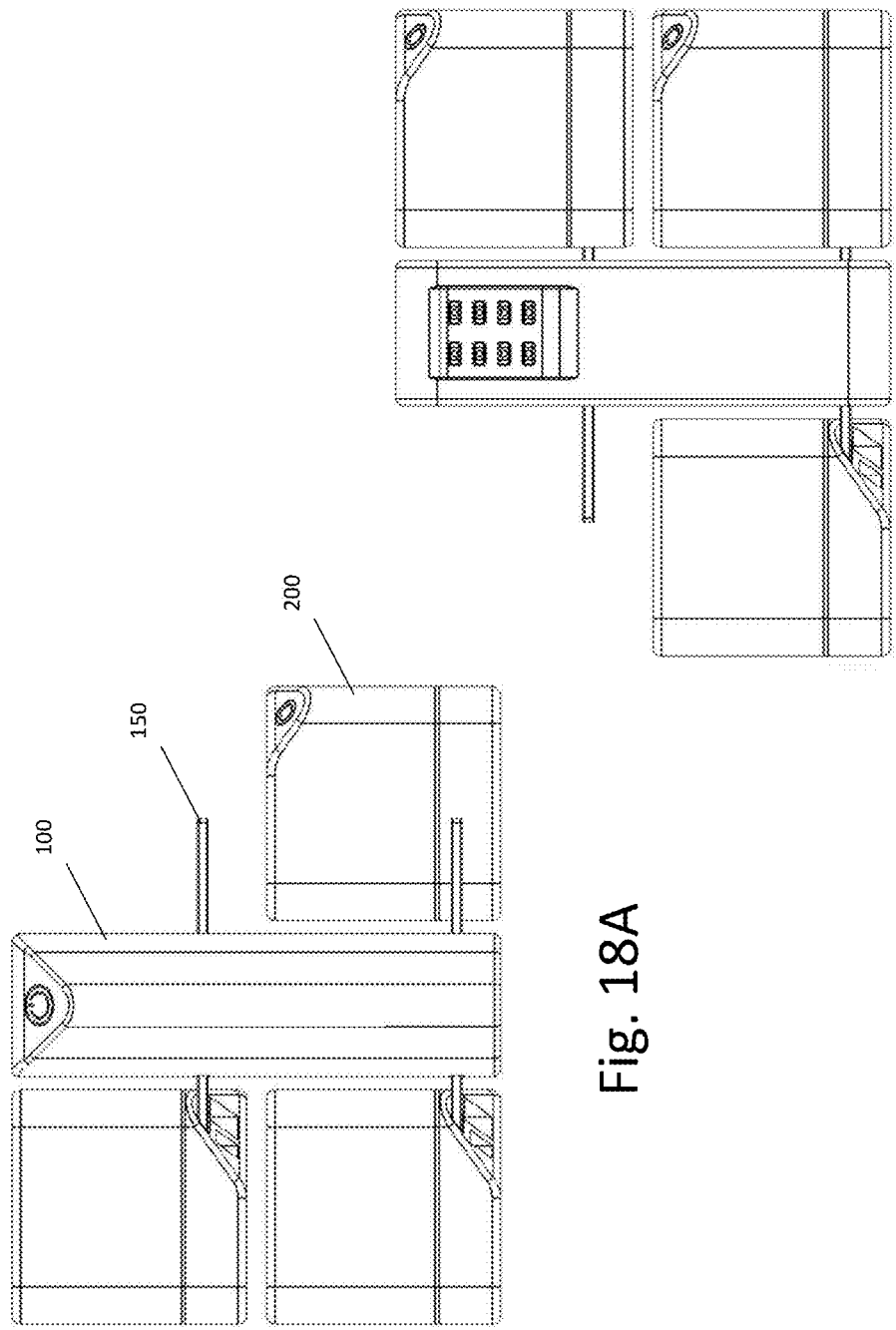

1

MODULAR COMPUTER SYSTEM AND METHOD

PRIORITY

This application claims priority to U.S. Provisional Patent Application No. 62/034,018 filed on Aug. 6, 2014.

FIELD OF THE INVENTION

This invention pertains generally to home computer systems and more particularly toward a home based modular computer system and method of use thereof.

BACKGROUND OF INVENTION

Home based computer systems are fairly standard. Individuals utilize desktop computers, laptop computers, tablets, smart phones, and other types of wireless computerized devices. These devices connect to the internet usually through a router. Individuals can access information, data, or software applications through the internet connection. This information is stored on remote server computers and transmitted to the user's device in his house when he requests it. Software applications on the internet are normally executed on the server computer and the results are transmitted to the user's device through a network connection.

Internet based computing has many benefits. Information is stored on multiple servers, sometimes in separate locations. This provides redundancy, allowing information to be decentralized. If one computer in the network fails then others are there to replace it. The computer nodes are connected together so that data can flow freely from one node to another. The data can flow in any direction to any number of nodes on its way to it destination. Internet based computing has many limitations though. In exchange for redundancy and ease of use, a user is giving up ease of access and can lose control of personal and sensitive information to third parties. For instance, if a user completely loses connection to the internet through a failure by an internet service provider, the user cannot access the information stored online. In addition, there is no guarantee that third parties who own and store information on their services will keep the user's information secure. Hackers may be able to penetrate firewalls established by these offsite storage companies. In addition, the companies themselves may use the information stored on their servers and owned by the user in a manner which the user may not find acceptable.

What is needed is a computer architecture and method of use which provides the redundancy and elasticity of internet computing but is in the full access and control of a user, in the home of the user.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The invention is directed to a home computing device comprising one or more resource modules and one or more chassis. Each of the resource modules comprise an external housing, one or more microprocessor units, one or more nonvolatile memory storage units, one or more transceivers, and one or more Ethernet ports. The external housing of each of the resource modules has a top side, a bottom side, a front side, a back side, a left side, and a right side. Each of the chassis comprise a body, one or more receptacles disposed in the body, the one or more receptacles configured to receive the one or more resource modules, wherein the one or more resource modules may be removably secured respectively to the one or more receptacles, one or more Ethernet ports disposed in the one or more receptacles. Each Ethernet port disposed in the receptacle is communicatively connected to the Ethernet port on the resource module when the resource module is removably secured to the receptacle.

Furthermore, the top side, bottom side, front side, back side, left side, and right side of the external housing are continuous surfaces lacking ventilation holes. In another embodiment, the resource module does not comprise a fan.

Each of the resource modules are configured to operate on a maximum power of between 15 Watts and 50 Watts. Preferably, each of the resource modules are configured to operate on a maximum power of 25.5 Watts. Each of the resource modules are communicatively coupled to one or more resource modules via the wireless transceiver. Alternatively, each of the resource modules are communicatively coupled to one or more resource modules via an Ethernet connection between the Ethernet port of the resource module to the chassis.

In another embodiment each of the one or more nonvolatile memory storage units of each of the resource modules stores instructions which when executed by the one or more microprocessor units cause the resource modules to perform operations comprising transmitting a beacon signal from one or more first computer resource modules, receiving the beacon signal on one or more second computer resource modules communicatively coupled to the one or more first computer resource modules, filtering received beacon signal for those containing an alphanumeric identifier specific to a computer resource module, and creating a registry listing each of the one or more first computer resource modules whose beacon signals have been received by the one or more second computer resource modules. The beacon signal comprises a media access control address, an internet protocol address, and an alphanumeric identifier specific to the first computer resource module. The registry comprises a media access control address and internet protocol address for each of the one or more first computer resource modules. In another embodiment each of the one or more resource modules are configured to form an ad hoc wifi network via the one or more transceivers of the one or more resource modules.

In another embodiment of the invention the external housing of each of the one or more resource modules has a recess shaped to receive an arm of a chassis. In this embodiment the chassis lacks a receptacle but instead further comprises one or more arms extending from the body of the chassis and one or more Ethernet ports disposed in the body. The one or more resource modules may be removably secured respectively to the one or more arms of the chassis. One of the one or more Ethernet ports disposed in the body is communicatively connected to one Ethernet port disposed on one resource module when the resource module is removably secured to the arm.

The invention is also directed to a process of creating a cluster of computer resource modules acting in concerted fashion comprising transmitting a beacon signal from one or more first computer resource modules, receiving the beacon signal on one or more second computer resource modules communicatively coupled to the one or more first computer resource modules, and creating a registry listing each of the one or more first computer resource modules whose beacon signals have been received by the one or more second computer resource modules. The registry comprises a media access control address and internet protocol address for each of the one or more first computer resource modules.

The method may further comprise transmitting the beacon signal from the one or more first computer resource modules at a predetermined interval of time. The method may further comprises a means for electing a lead computer resource module for the one or more first computer resource modules. The method may further comprise independently and respectively establishing a priority value for each of the one or more first computer resource modules. The method may further comprise transmitting the priority value of each of the one or more first computer resource modules to each of the one or more second computer resource modules.

The method may further comprise selecting one of the one or more computer resource modules to operate as the lead computer resource module based on the priority value. The method may further comprise selecting one of the one or more second computer resource modules to operate as the lead computer resource module in the event of a failure of the current lead computer resource module. The selection of the lead computer resource module may be based on the highest numerical value as the priority value or the lowest numerical value as the priority value.

The invention is also directed toward a computerized method of organizing one or more computer resource modules. The computerized method is performed on a computer resource module comprising one or more transceivers, one or more microprocessors, and one or more nonvolatile memory units. The one or more nonvolatile memory units store instructions which when executed by the one or more microprocessors cause the computer resource module to perform operations comprising transmitting a beacon signal from one or more first computer resource modules, receiving the beacon signal on one or more second computer resource modules communicatively coupled to the one or more first computer resource modules, and creating a registry listing each of the one or more first computer resource modules whose beacon signals have been received by the one or more second computer resource modules. The registry comprises a media access control address and internet protocol address for each of the one or more first computer resource modules.

The computerized method may further comprise a means for electing a lead computer resource module for the one or more first computer resource modules. The computerized method may further comprise independently and respectively establishing a priority value for each of the one or more first computer resource modules. The computerized method may further comprise transmitting the priority value of each of the one or more first computer resource modules to each of the one or more second computer resource modules.

The computerized method may further comprise selecting one of the one or more computer resource modules to operate as the lead computer resource module based on the priority value. The computerized method may further comprising selecting one of the one or more second computer resource modules to operate as the lead computer resource module in the event of a failure of the current lead computer resource module.

The invention is also directed to a method for organizing and storing data for a software application. The method is performed on a first computer resource module communicatively coupled to one or more second computer resource modules. The first computer resource module is executing a software application during the method. The first computer resource module and each of the one or more second computer resource modules comprise an external housing having a top side, a bottom side, a front side, a back side, a left side, and a right side, one or more microprocessor units, one or more nonvolatile memory storage units, one or more transceivers, and one or more Ethernet ports. The first computer resource module and each of the one or more second computer resource modules are coupled to a chassis. The chassis comprises a body and one or more Ethernet ports disposed in the body. Each of the one or more Ethernet ports disposed in the first computer resource module and each of the second computer resource modules are communicatively coupled to one or more Ethernet ports in the chassis. The method comprises receiving a request from an application for the creation of an application specific data storage volume, creating an application specific data storage volume stored on one or more memory units of the first computer resource module and one or more the second computer resource modules, and maintaining the application specific data storage volume after the first computer resource module has terminated the execution of the application.

The method may further comprise receiving a replica count request for data stored in the application specific data storage volume from the application, receiving a requested storage volume size for the application specific data storage volume from the application, receiving a persistence request for the application specific data storage volume from the application, receiving an encryption method and associated encryption key from the application, and encrypting each copy of the two or more data file segments in accordance with the encryption method and associated encryption key.

The method may further comprise receiving a request from the application to store an application data file in the application specific data storage volume, segmenting the application data file into two or more data file segments, copying each of the two or more data file segments in accordance with the received replica count, transmitting at least one copy of the two or more data file segments to a second computer resource module communicatively coupled to the first computer resource module, and recording the storage location for each copy of the two more data file segments in a data file log. The method may further comprise receiving a request from a software application for a data file, retrieving the data file log, and determining the location of a copy of each of the two or more data file segments from the data file log. The method may further comprise transmitting a copy of each of the two or more data file segments to a client computer. Alternatively, the method may further comprise retrieving a copy of each of two or more data file segments from the one or more memory units of the two or more computer resource modules and combining each retrieved copy of the two or more data file segments into a complete data file. The method may further comprise transmitting the data file to a client computer.

In alternative embodiment of the method, the method further comprises receiving a request from the application to store an application data file in the application specific data storage volume, segmenting the application data file into two or more data file segments, copying each of the two or more data file segments in accordance with a default replica count established in the first computer resource module, encrypting each copy of the two or more data file segments in accordance with a default encryption method and associated encryption key established in the first computer resource module, transmitting at least one copy of the two or more data file segments to a second computer resource module communicatively coupled to the first computer resource module, and recording the storage location for each copy of the two or more data file segments in a data file log. The method may further comprise receiving a request from a software application for a data file, retrieving the data file log, and determining the location of a copy of each of the two or more data file segments from the data file log. The method may further comprise transmitting a copy of each of the two or more data file segments to a client computer. The method may further comprise retrieving a copy of each of two or more data file segments from the one or more memory units of the two or more computer resource modules and combining each retrieved copy of the two or more data file segments into a complete data file. The method may further comprising transmitting the data file to a client computer.

A method for determining a specific computer resource module to execute a software application comprising receiving, at a first computer resource module, a request from a client computer device to launch a software application stored on one or more computer resource modules, determining a plurality of parameters of each of one or more second computer resource modules, selecting, by the first computer resource module, one of the one or more second computer resource modules for launching and executing the software application, and launching and executing the software application by the selected second computer resource module.

Furthermore, in the method, the step of determining a plurality of parameters of each of one or more second computer resource modules comprises determining, at a first computer resource module, the free memory available on each or the one or more second computer resource modules, the memory requirements of the requested software application, the number of software applications being executed on each of the one or more second computer resource modules, the processor availability of each of the one or more second computer resource modules, the processor requirements of the requested software application, the network input/output capacity of each of the one or more second computer resource modules, the network input/output capacity of the requested software application, and the priority value of each of the one or more second computer resource modules.

The invention is also directed to a computerized method for determining a specific computer resource module to execute a software application. The computerized method is performed on a first computer resource module communicatively coupled to one or more second computer resource modules. The first computer resource module comprises one or more transceivers, one or more microprocessors, and one or more nonvolatile memory units. The one or more nonvolatile memory units store instructions which when executed by the one or more microprocessors cause the first computer resource module to perform operations comprising receiving a request from a client computer device to launch a software application stored on one or more computer resource modules, determining a plurality of parameters of each of one or more second computer resource modules, selecting one of the one or more second computer resource modules for launching and executing the software application, and launching and executing the software application by the selected second computer resource module. In this method the first computer resource module and each of the one or more second computer resource modules are coupled to a chassis. The chassis comprises a body and one or more Ethernet ports disposed in the body. Each of the one or more Ethernet ports disposed in the first computer resource module and each of the second computer resource modules are communicatively coupled to one or more Ethernet ports in the chassis.

In the computerized method the step of determining a plurality of parameters of each of one or more second computer resource modules may comprise determining the free memory available on each or the one or more second computer resource modules, the memory requirements of the requested software application, the number of software applications being executed on each of the one or more second computer resource modules, the processor availability of each of the one or more second computer resource modules, the processor requirements of the requested software application, the network input/output capacity of each of the one or more second computer resource modules, the network input/output capacity of the requested software application, and the priority value of each of the one or more second computer resource modules.

The invention is further directed to a method of providing an in-home computer network comprising providing one or more computer resource modules and providing one or more chassis. Each of the one or more computer resource modules comprise an external housing, one or more microprocessor units, one or more nonvolatile memory storage units, one or more transceivers, and one more Ethernet ports. The external housing of each of the one or more computer resource modules has a top side, a bottom side, a front side, a back side, a left side, and a right side. Each of the one or more chassis comprise a body, a means for removably securing the one or more computer resource modules to the body of the chassis, and one or more Ethernet ports disposed in the body. The one or more Ethernet ports disposed in each of the one or more computer resource modules is communicatively connected to one or more Ethernet ports in the body of the chassis. The method may further comprise communicatively connecting the chassis to an internet connection in a residential or business unit and removably securing the one or more computer resource modules to the one or more chassis.

Still other embodiments of the present invention will become readily apparent to those skilled in this art from the following description wherein there is shown and described the embodiments of this invention, simply by way of illustration of the best modes suited to carry out the invention. As it will be realized, the invention is capable of other different embodiments and its several details are capable of modifications in various obvious aspects all without departing from the scope of the invention. Accordingly, the drawing and descriptions will be regarded as illustrative in nature and not as restrictive.

BRIEF DESCRIPTION OF THE DRAWINGS

Various exemplary embodiments of this invention will be described in detail, wherein like reference numerals refer to identical or similar components, with reference to the following figures, wherein:

FIG. 18A is a front view of a chassis with attached resource modules;

FIG. 18B is a back view of a chassis with attached resource modules;

DETAILED DESCRIPTION OF THE PREFERRED EMBODIMENT

Figure 1A:
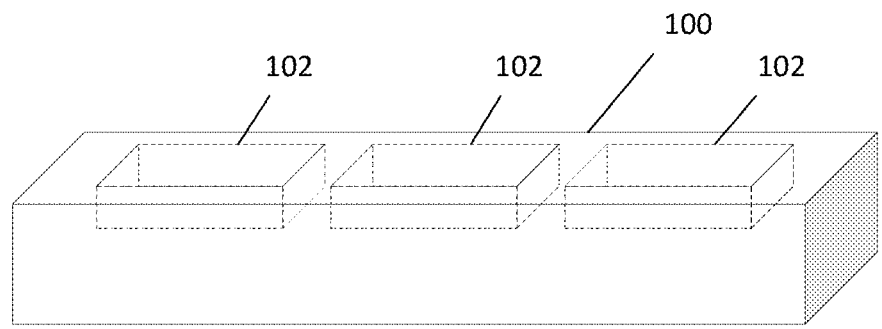
FIG. 1A is a view of a chassis.
Figure 1B:
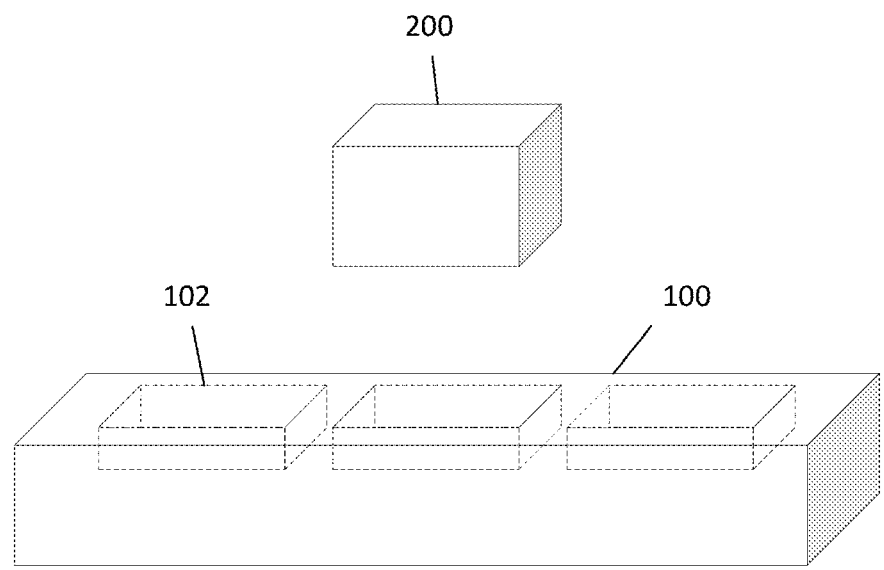
FIG. 1B is a view of a resource module with a chassis.
Figure 1C:
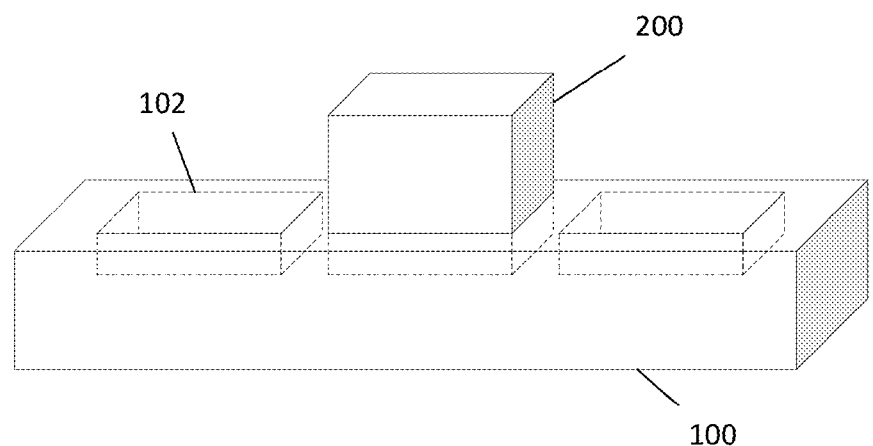
FIG. 1C is a view of a resource module connected to a chassis.

The claimed subject matter is now described with reference to the drawings. In the following description, for purposes of explanation, numerous specific details are set forth in order to provide a thorough understanding of the claimed subject matter. It may be evident, however, that the claimed subject matter may be practiced with or without any combination of these specific details, without departing from the spirit and scope of this invention and the claims.

As used in this application, the terms "component", "module", "system", "interface", or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component.

Referring to FIG. 1, the preferred embodiment of a chassis 100 is illustrated. The chassis 100 is a support structure configured to provide power to resource modules. The chassis 100 has a plurality of receptacles 102. Each receptacle 102 provides a support structure for the receipt of a single resource module. Each receptacle 102 is preferably an indented area into the body of the chassis 100. In other embodiments the receptacle 102 may be external slots or other physical support structures configured to receive and hold a resource module. As illustrated in FIG. 1B and FIG. 1C, a user may connect a resource module 200 to the chassis 100 by placing the resource module 200 in the receptacle 102. The resource module 200 may be placed in any receptacle 102 and still function properly. In the preferred embodiment the chassis 100 only needs to have one resource module 200 for the resource module 200 to function properly. Alternatively, the chassis 100 may require multiple resource modules 200 before the resource modules 200 function properly.

The chassis 100 may be any size and shape and hold any number of resource modules 200. The chassis 100 may further comprise control means, such as a power switch, control knobs, a touch screen display, levers, buttons, or other physical ways to manipulate the operation of the resource modules 200 connected to the chassis 100. In other embodiments, the chassis 100 may have a central processor, memory storage, and a transceiver for wireless communication.

In the preferred embodiment only one resource module 200 may be placed in a receptacle 102 at a time. However, in other embodiments a receptacle 102 may hold multiple resource modules. In the preferred embodiment each receptacle 102 may have an Ethernet port, data port, or other wired connection for a physical wired connection to the resource module placed in it. In some embodiments, power may be supplied to the resource module through the Ethernet port, such as via power over Ethernet (PoE). In other embodiments the chassis 100 may provide power to the resource modules 200 through other means, such by a standard electrical connection or through connectionless means such as by inductive charging. In the preferred embodiment, the Ethernet port of the chassis 100 provides the primary connectivity port to permit the resource modules 200 to access remote computers and the internet. In other embodiments, the Ethernet port of the chassis 100 is the primary connectivity port for the resource modules 200 to communicate with each other, either within the same cluster or with resource modules in another cluster.

Figure 1D:
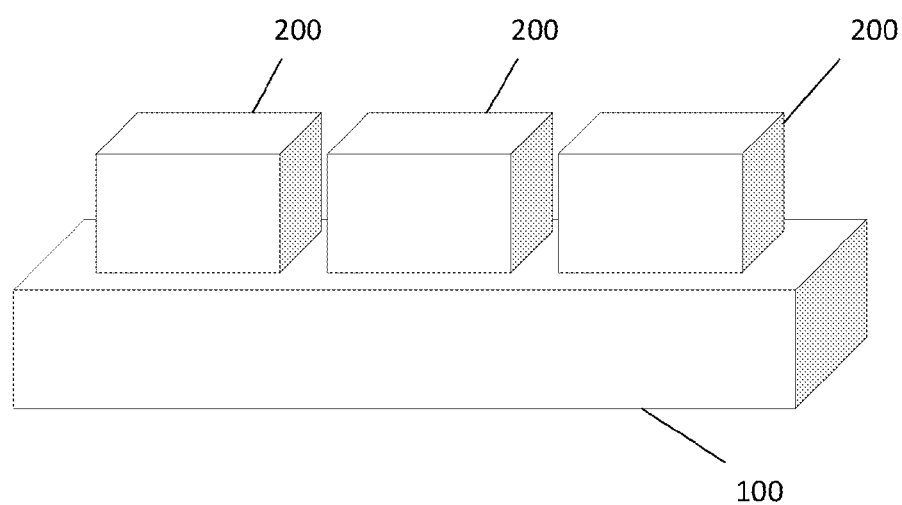
FIG. 1D is a view of multiple resource modules connected to a chassis.

As illustrated in FIG. 1D, multiple resource modules 200 are inserted into the chassis 100 to form a cluster. A cluster can be formed by any number of resource modules 200. The cluster may be only those resource modules 200 on one chassis 100. Alternatively, a cluster may be made up of resource modules 200 on two or more chassis. A cluster is any number of resource modules 200 which are communicatively coupled together to act as a unit.

Figure 2:
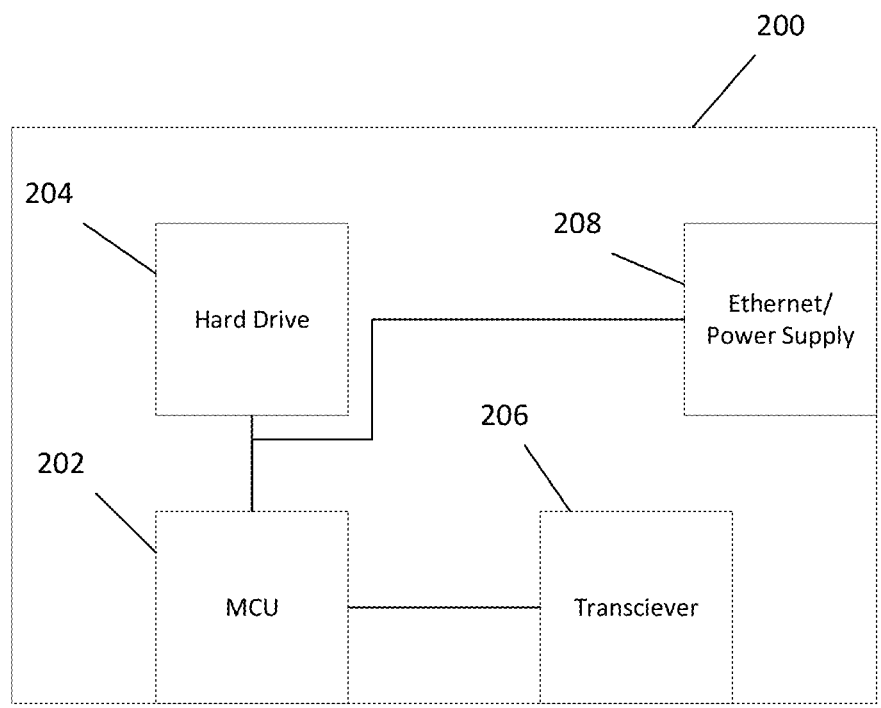
FIG. 2 is a schematic view of the components of a resource module.

Referring to FIG. 2, the preferred embodiment of the resource module 200 is illustrated. The components of the resource module 200 are disposed in an external housing. In the preferred embodiment the external housing has a smooth continuous surface and lacks ventilation holes. In other embodiments, the housing of the resource module 200 has ventilation holes for heat management. The housing of the resource module 200 may be made out of any material. The housing may be made of a metal such as aluminum or steel or it may be made out of a thermoplastic, such as polypropylene or polystyrene. The resource module 200 has a processor unit 202. The processor unit 202 performs all of the functions of the resource module 200, executes instructions and applications, and manages the performance of the resource module 200. The processor unit 202 may be any type of processor, and may have executable instructions stored on the processor in software or hardware form, such as a system on a chip. Connected to the processor unit 202 is a hard drive 204. The hard drive 204 may be partitioned into separate operating sections. In other embodiments the resource module has more than one hard drive 204. Also connected to the processor unit 204 is a transceiver 206. The transceiver 206 provides a means of wireless communication with the resource module 200. The resource module 200 may communicate with client devices or other resource modules 200 via the transceiver 206. In addition, the processor unit 202 is connected to an Ethernet port 208. In the preferred embodiment the Ethernet port 208 is also the power supply for the resource module 200. In other embodiments the power supply may be a separate connection from the Ethernet port 208. The Ethernet port 208 provides a means for wired data transmission to and from the resource module 200. The resource module 200 may be any size and shape. In some embodiments the resource module 200 is cuboid in shape. In this embodiment the resource module 200 may be referred to resource cube. As a resource cube, a resource module 200 is no different in configuration or operation other than the shape of the outer housing.

Figure 3:
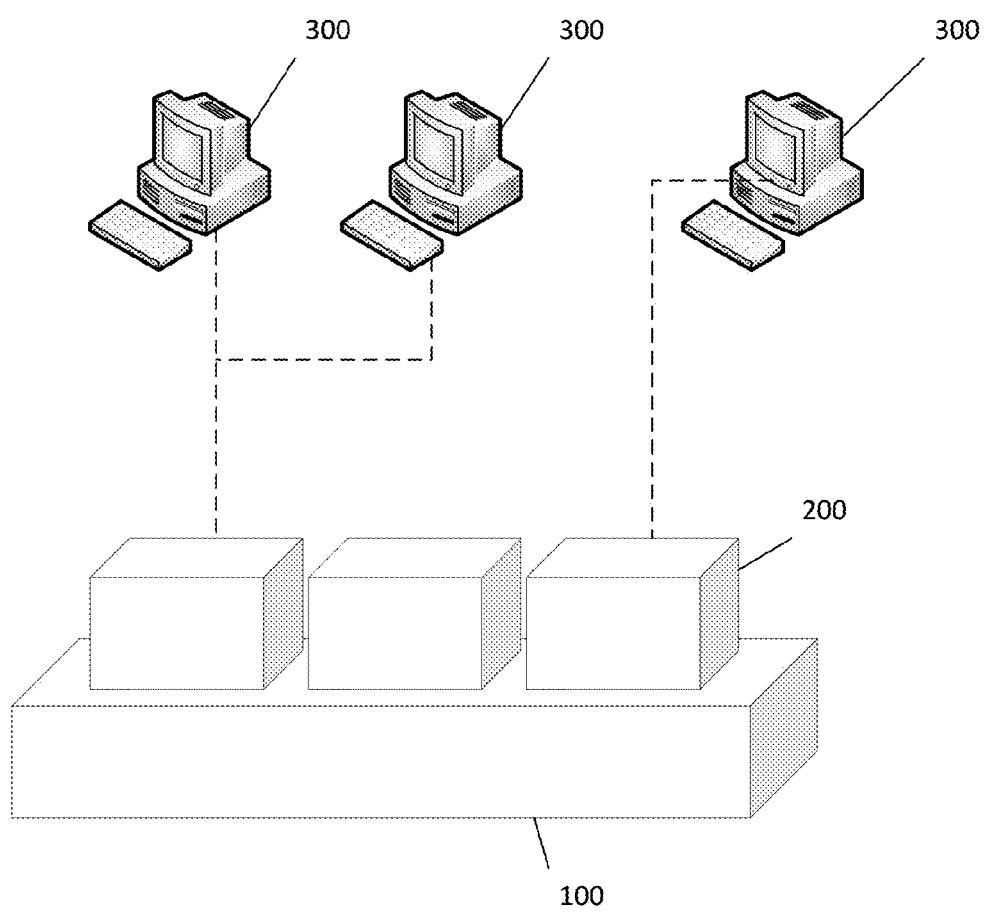
FIG. 3 is a view of client computers communicatively coupled to a cluster of resource modules.

As illustrated in FIG. 3, the cluster of resource modules 200 is communicatively connected to a plurality of client devices 300. Multiple client devices 300 may be communicatively connected to a single resource module 200. Alternatively, each client device 300 may be communicatively connected to a separate resource module 200. In other embodiments, each client device 300 has a unique and dedicated resource module 200. In the preferred embodiment, all client devices 300 communicate with an initial resource module 200. If the initial resource module 200 requires additional memory, computing power, or resources, it may obtain those resources from additional resource modules 200 in the cluster. In some embodiments, the initial resource module 200 may seek resources from resource modules 200 in other clusters. In some embodiments the initial resource module 200 may "hand off" a client device 300 to another resource module 200 and the second resource module 200 communicates directly with the client device 300.

Figure 4:
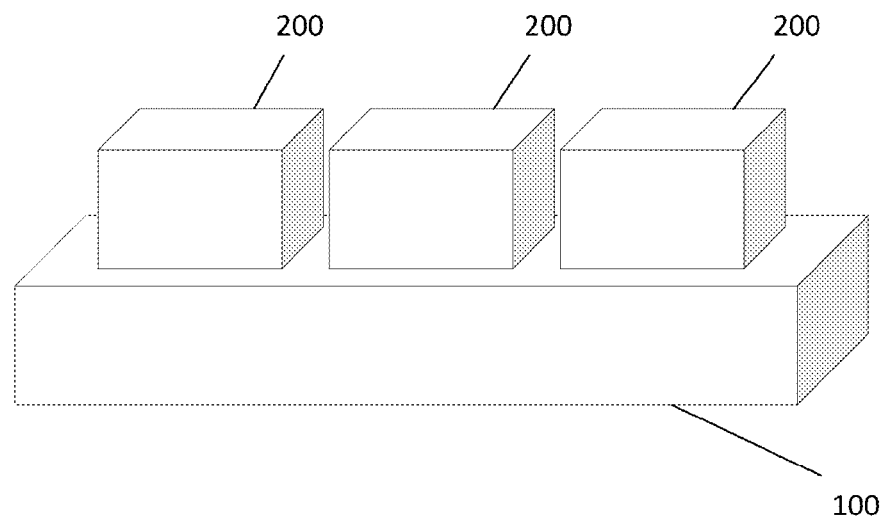
FIG. 4 is a view of multiple clusters of resource modules.
Figure 4:
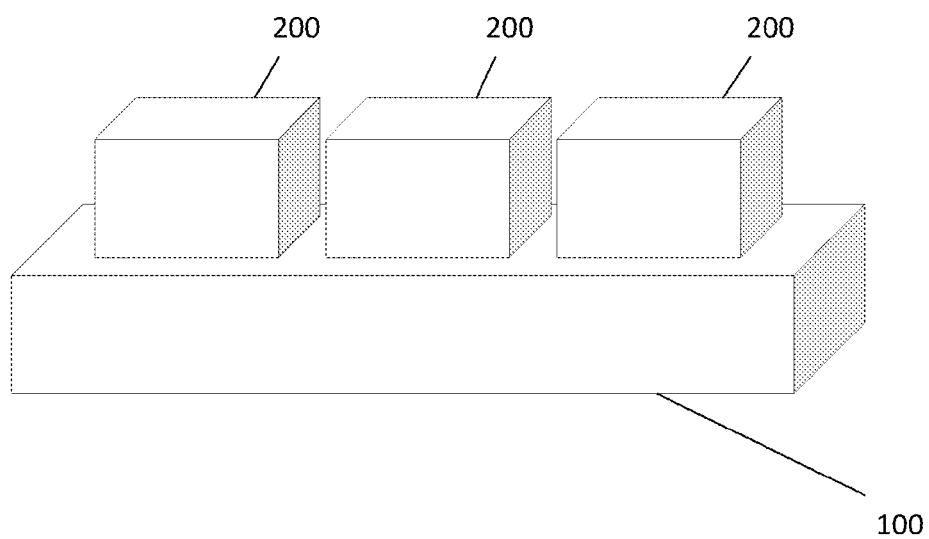

As shown in FIG. 4, multiple clusters of resource modules 200 may be formed. In the preferred embodiment each cluster has its own individual chassis 100. All of the resource modules 200 stored on one chassis 100 may form a cluster. Alternatively, a user may configure any arrangement of the resource modules 200 to form one cluster. In one embodiment, a cluster may be formed by resource modules 200 on multiple chassis 100.

Figure 5A:
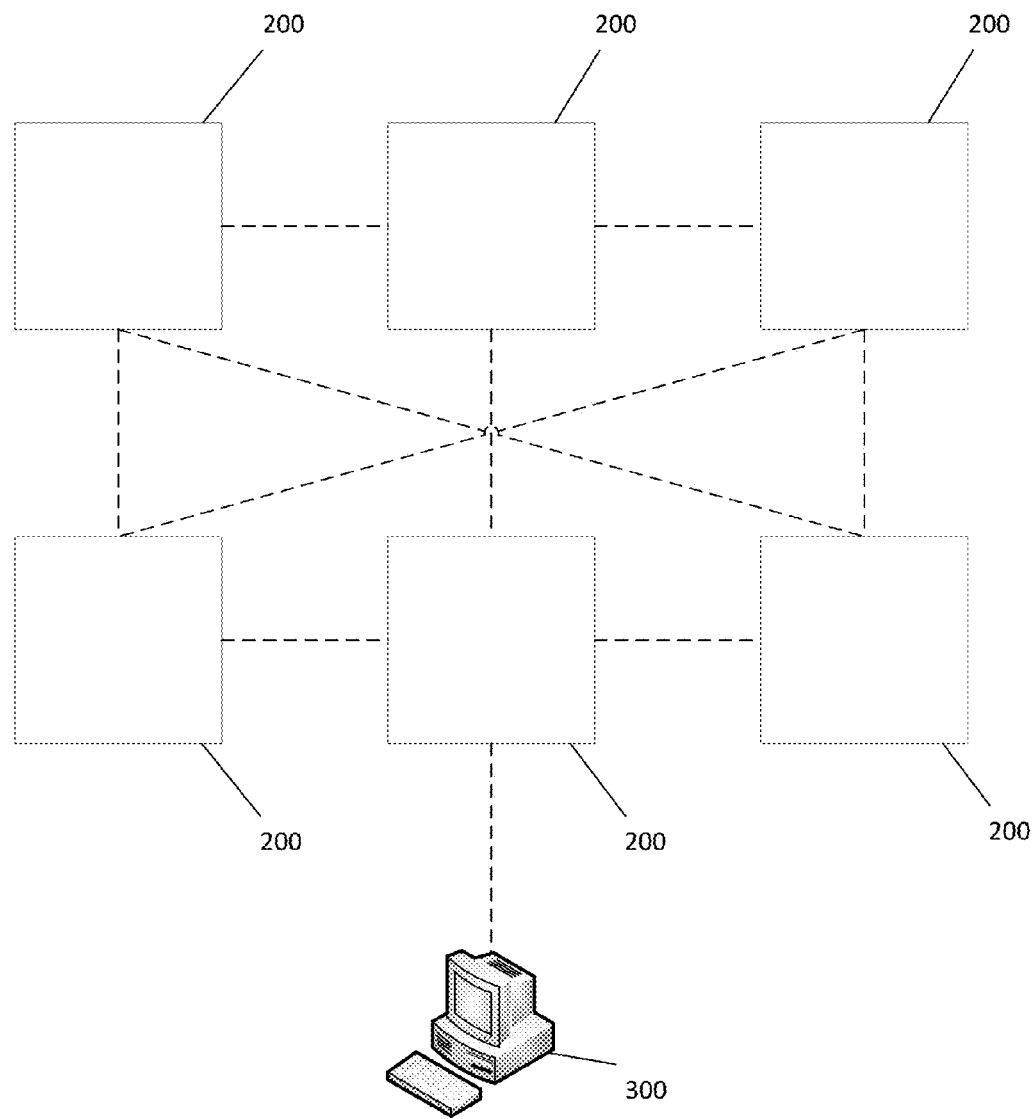
FIG. 5A is a schematic of a client computer communicatively coupled to multiple clusters of resource modules.
Figure 5B:
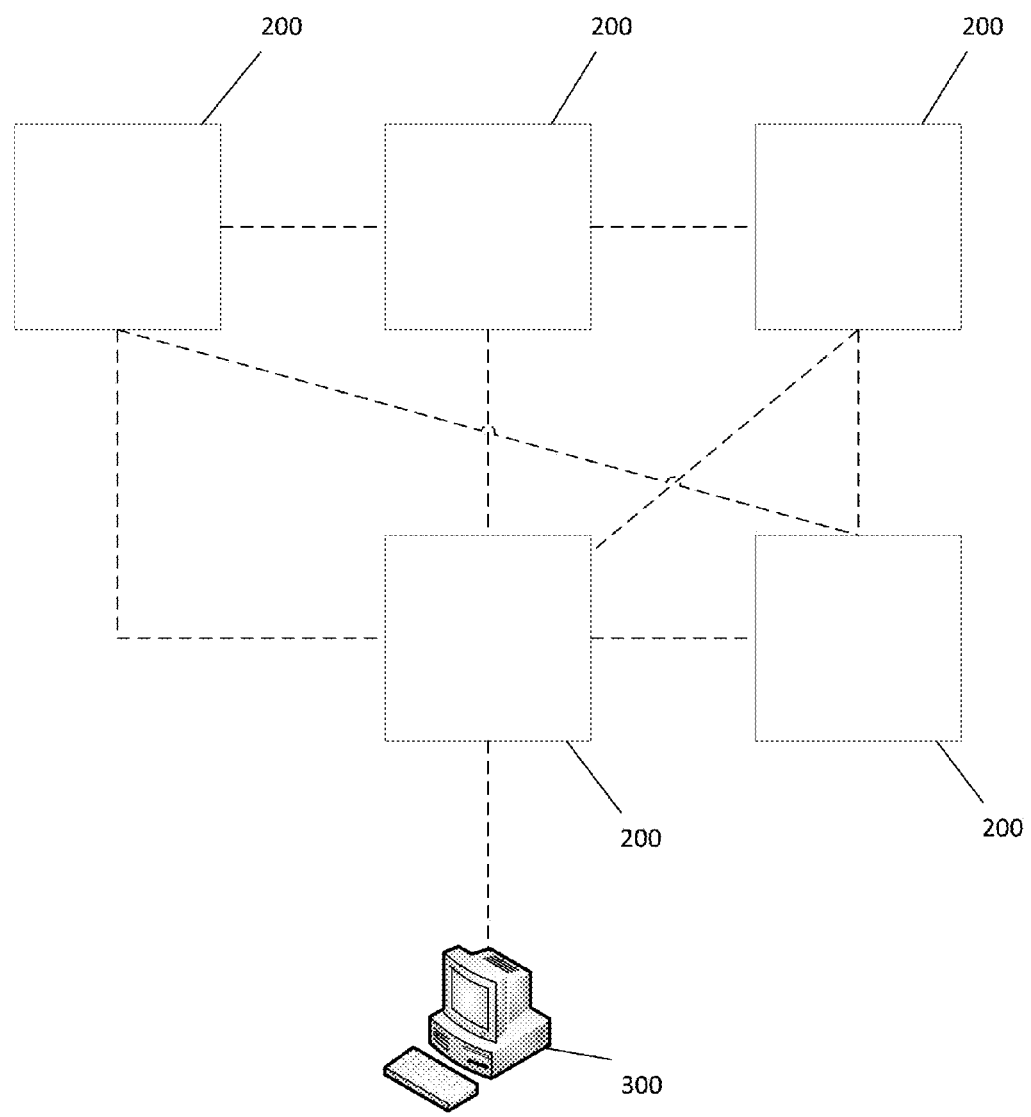
FIG. 5B is a schematic of a client computer communicatively coupled to multiple clusters of resource modules.
Figure 5C:
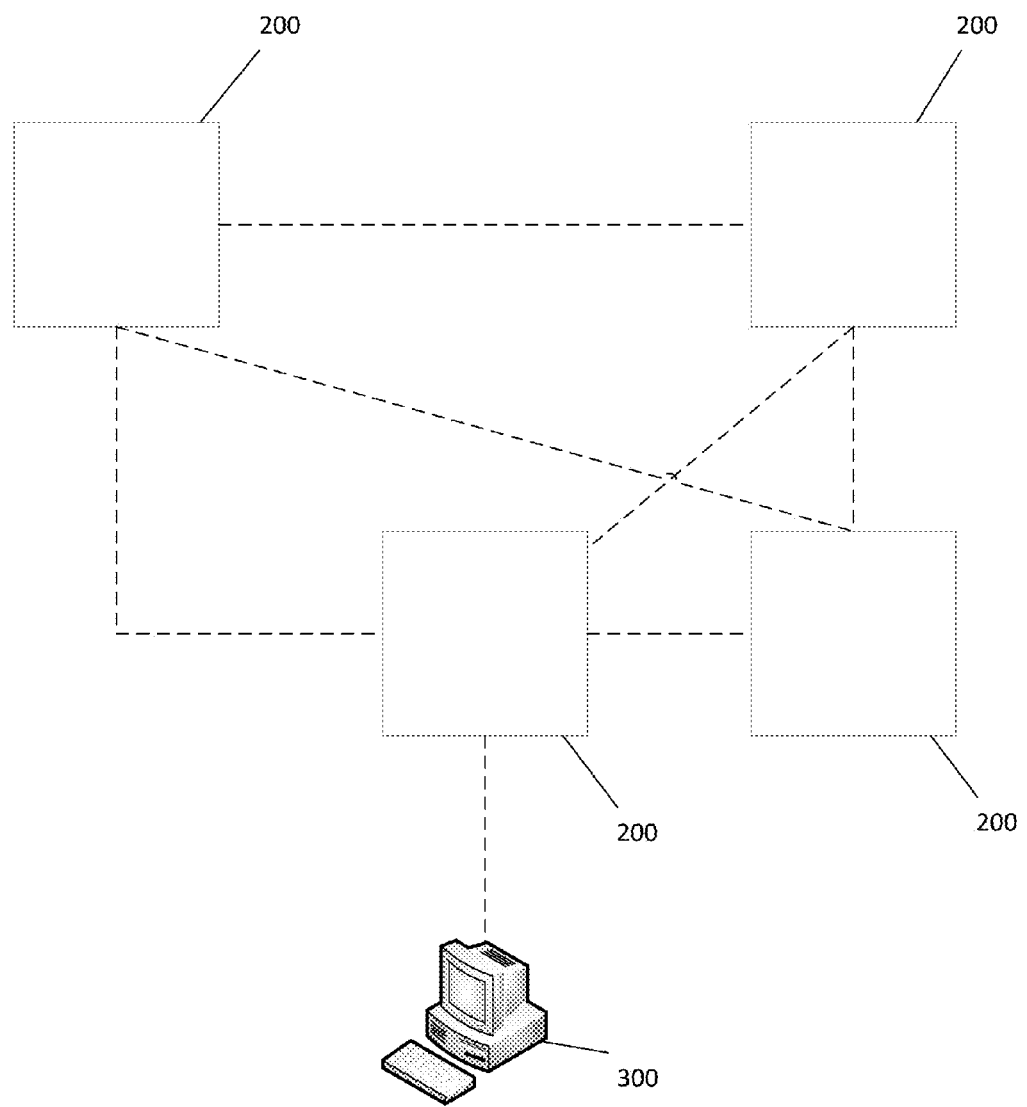
FIG. 5C is a schematic of a client computer communicatively coupled to multiple clusters of resource modules.

As illustrated in FIG. 5A through FIG. 5D, any number of resource modules 200 may be utilized. As illustrated, a client device 300 communicates with a single resource module 200 of a cluster. In the example illustrated in FIG. 5A, a cluster is formed by six resource modules 200. These resource modules 200 may be on a single chassis 100 or multiple chassis 100. In the illustrated example, the client device 300 communicates with a single resource module 200. All of the resource modules 200 in the cluster are communicatively coupled to the other resource modules 200 in the cluster. The resource modules 200 can coordinate amongst themselves to optimize computing power, memory, and speed of performance. As shown in FIG. 5B, if a resource module 200 is removed or becomes incapacitated then the remaining resource modules 200 reorganize around the missing or disabled resource module 200. The removed or missing resource module 200 may be on a separate chassis 100 than the remaining resource modules 200. As illustrated in FIG. 5C, if another resource module 200 is removed then the remaining resource modules 200 reorganize around the missing or disabled resource module 200. The missing or disabled resource modules 200 may be from the same or different chassis 100. In the embodiment illustrated in FIG. 5A through 5C, if the resource modules 200 are on different chassis 100 then all of the resource modules 200 on one chassis 100 are communicatively connected to all of the resource modules on another chassis 100.

Figure 5D:
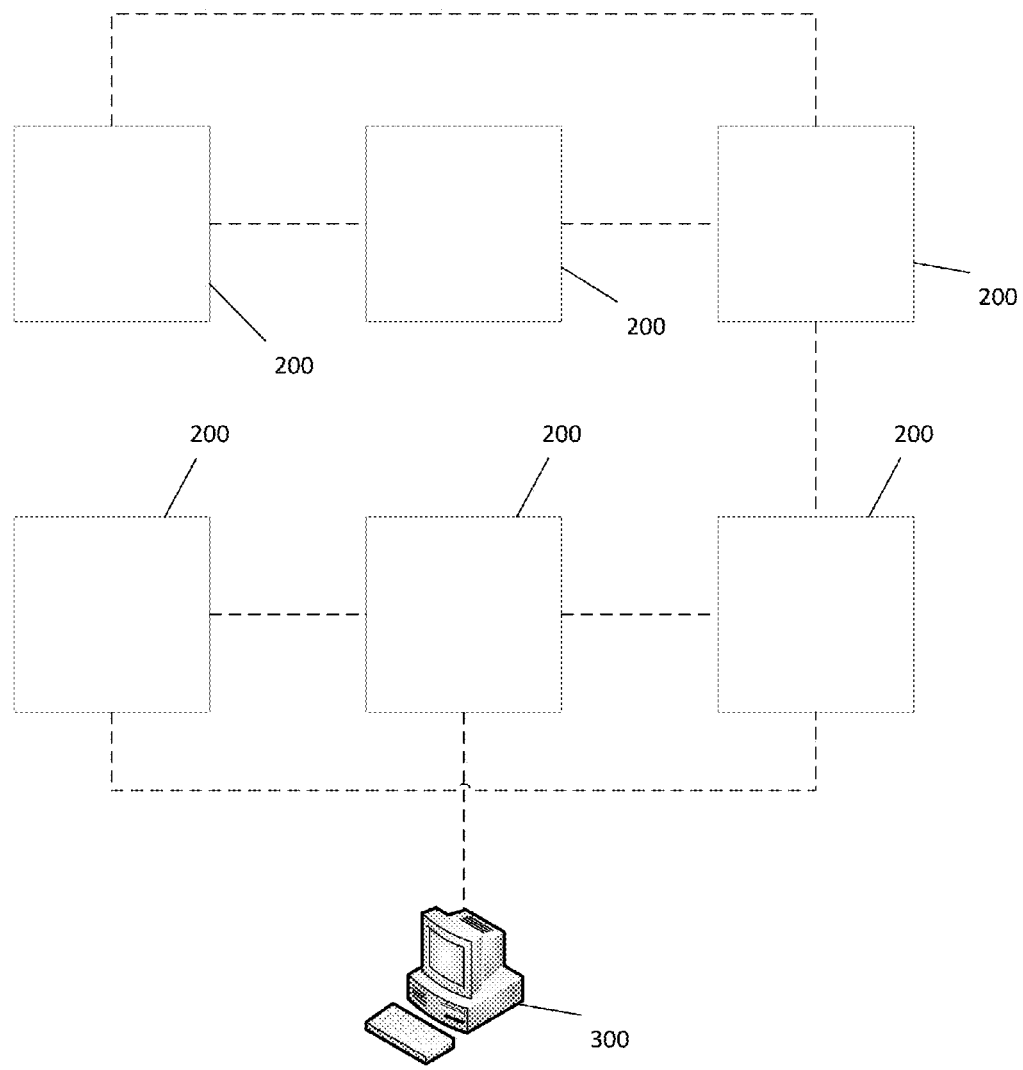
FIG. 5D is a schematic of a client computer communicatively coupled to multiple clusters of resource modules.

In another embodiment, as illustrated in FIG. 5D, the resource modules 200 are not communicatively coupled to all of the other resource modules 200. In the example illustrated in FIG. 5D, there are two groups of resource modules 200. These groups may be separate clusters on separate chassis 100, groups on the same chassis 100, or different resource modules 200 within a cluster. In the embodiment illustrated, all of the resource modules 200 within a group are communicatively coupled together. Designated resource modules 200 within the group are communicatively coupled to designated resource modules 200 in another group. In the example illustrated in FIG. 5D the client device 300 is communicatively coupled to a lead resource module 200 within one group. Data can be transferred to and from the client device 300 through the lead resource 200 to any resource module 200 within the group. The data can then be transferred to and from the second group of resource modules 200 through the designated resource modules 200.

Figure 6A:
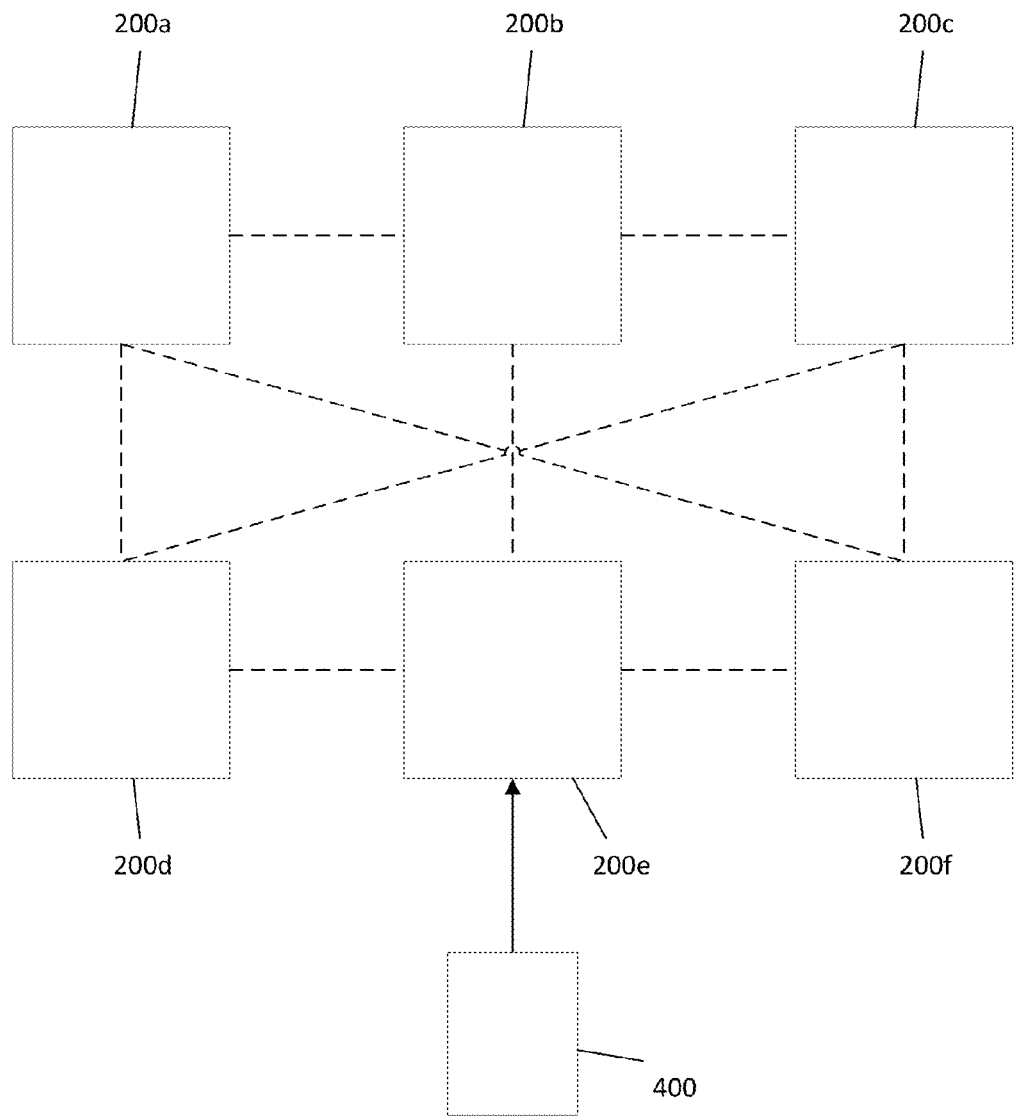
FIG. 6A is a schematic of a data file being stored on multiple clusters of resource modules.
Figure 6B:
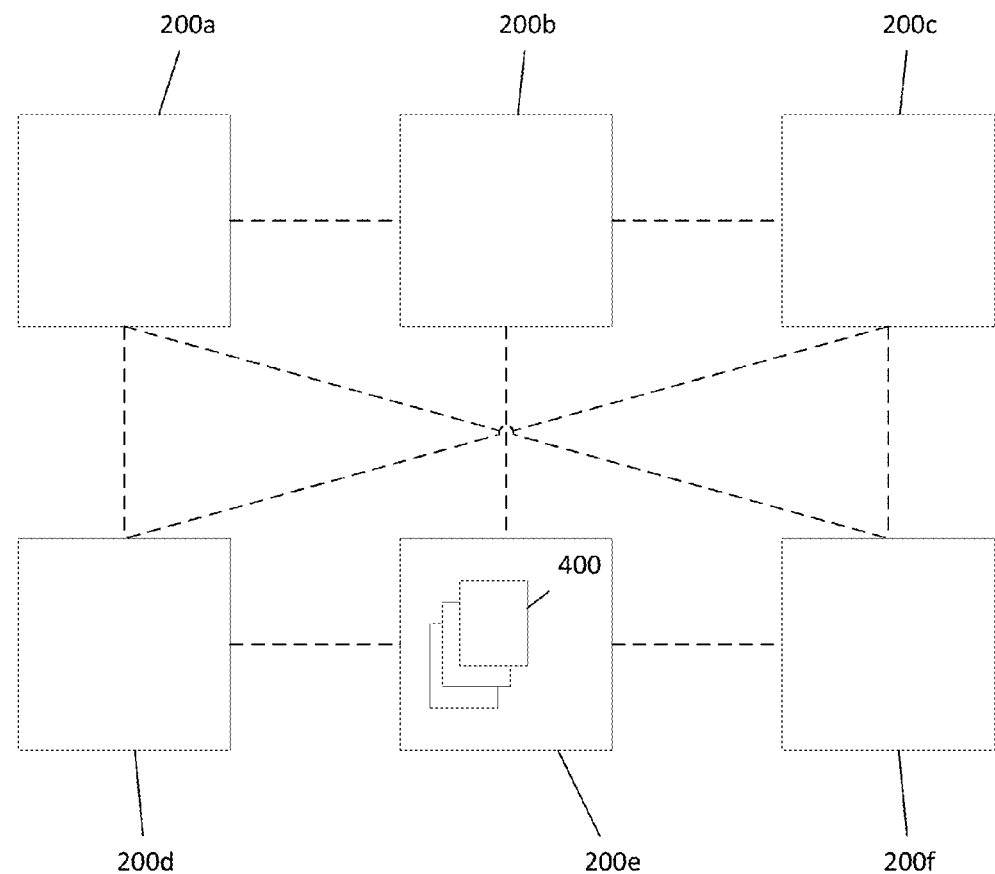
FIG. 6B is a schematic of a data file being stored on multiple clusters of resource modules.
Figure 6C:
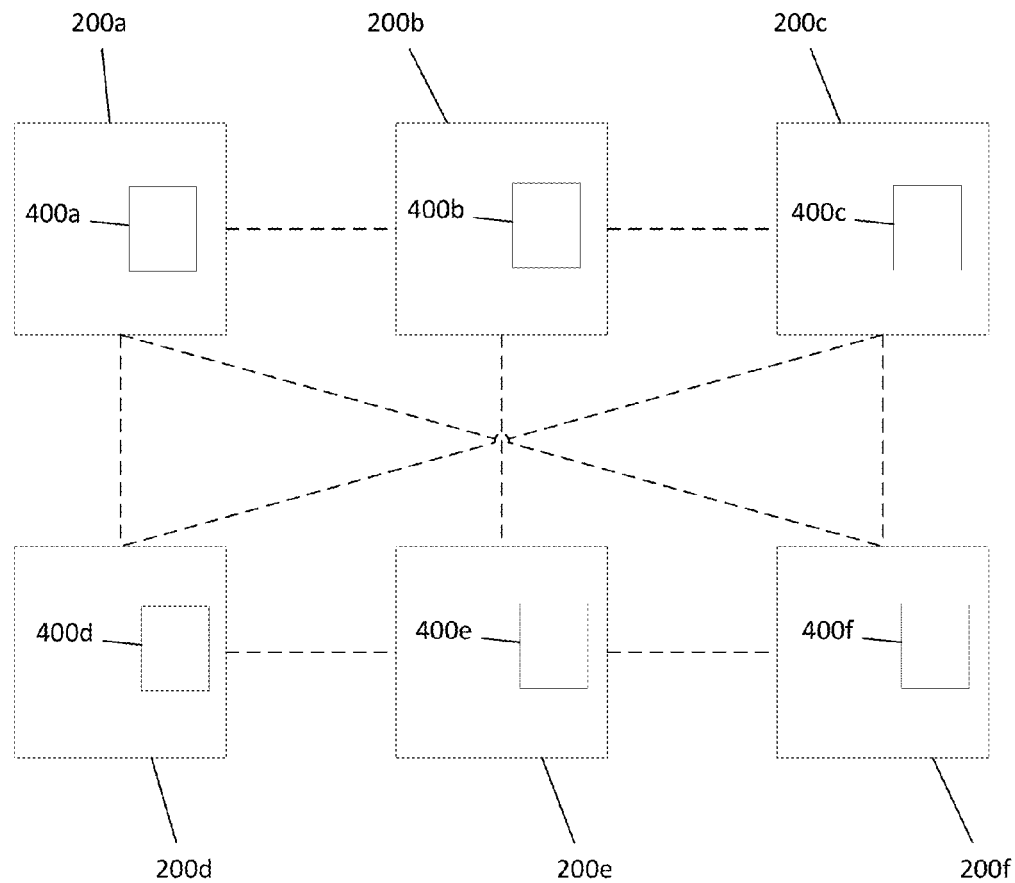
FIG. 6C is a schematic of a data file being stored on multiple clusters of resource modules.

As illustrated in FIG. 6A through FIG. 6I, the process of data transmission and manipulation on the resource modules 200 is illustrated. In the example illustrated there are six resource modules 200a, 200b, 200c, 200d, 200d, 200f with one resource module 200e designated as the leader resource module 200e. A client device transmits a data file 400 to the leader resource module 200e. As illustrated in FIG. 6B, the leader resource module 200e receives the data file 400 and replicates the data file 400. As shown in FIG. 6C, the copies of the data file, 400a, 400b, 400c, 400d, 400e, 400f are then transmitted and stored on the respective resource modules 200a, 200b, 200c, 200d, 200d, 200f. The copies of the data file 400a, 400b, 400c, 400d, 400e, 400f may be identical to each other, may be different versions or formats, or may be variations. The copies of the data file 400a, 400b, 400c, 400d, 400e, 400f may each be a full copy of the data file 400 or may be partial segments of the whole data file 400. In addition, each of the copies of the data file 400a, 400b, 400c, 400d, 400e, 400f may undergo data compression to minimize storage space. This method provides a built in redundancy and backup for the information stored on the resource modules 200a, 200b, 200c, 200d, 200d, 200f. In the preferred embodiment a user can access any one of the copies of the data file 400a, 400b, 400c, 400d, 400e, 400f from a client device 300 and view the original data file 400.

Figure 6D:
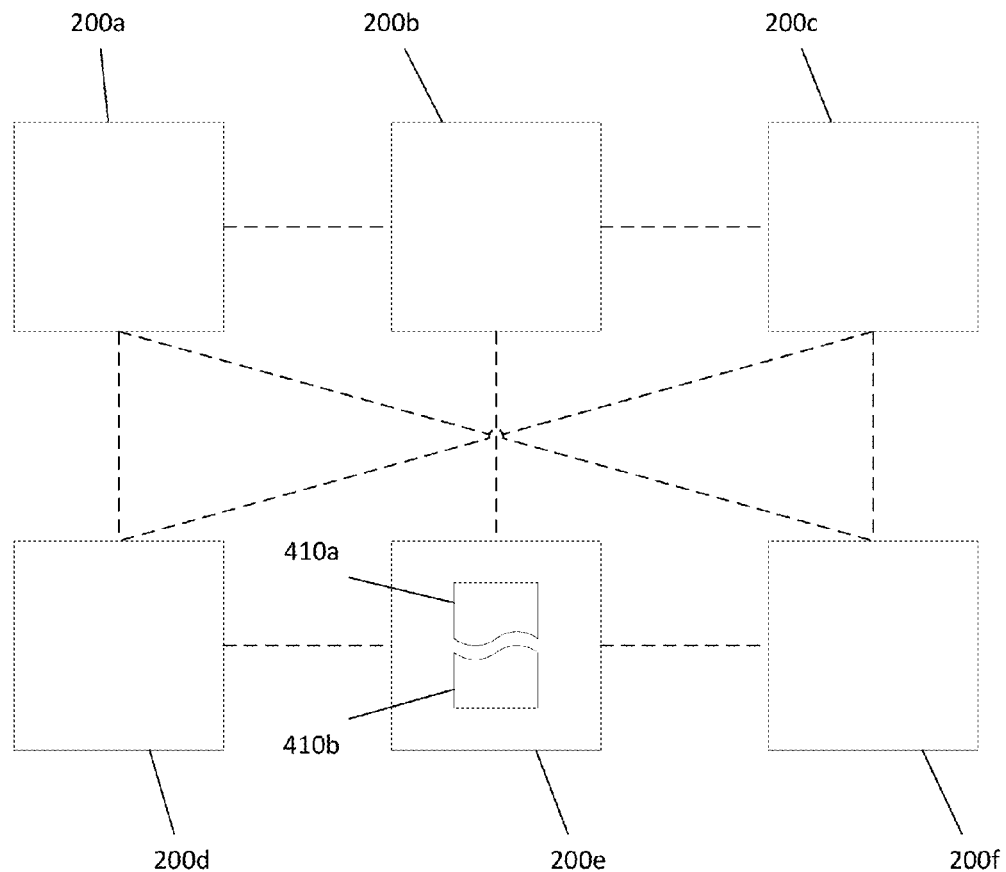
FIG. 6D is a schematic of a data file being stored on multiple clusters of resource modules.
Figure 6E:
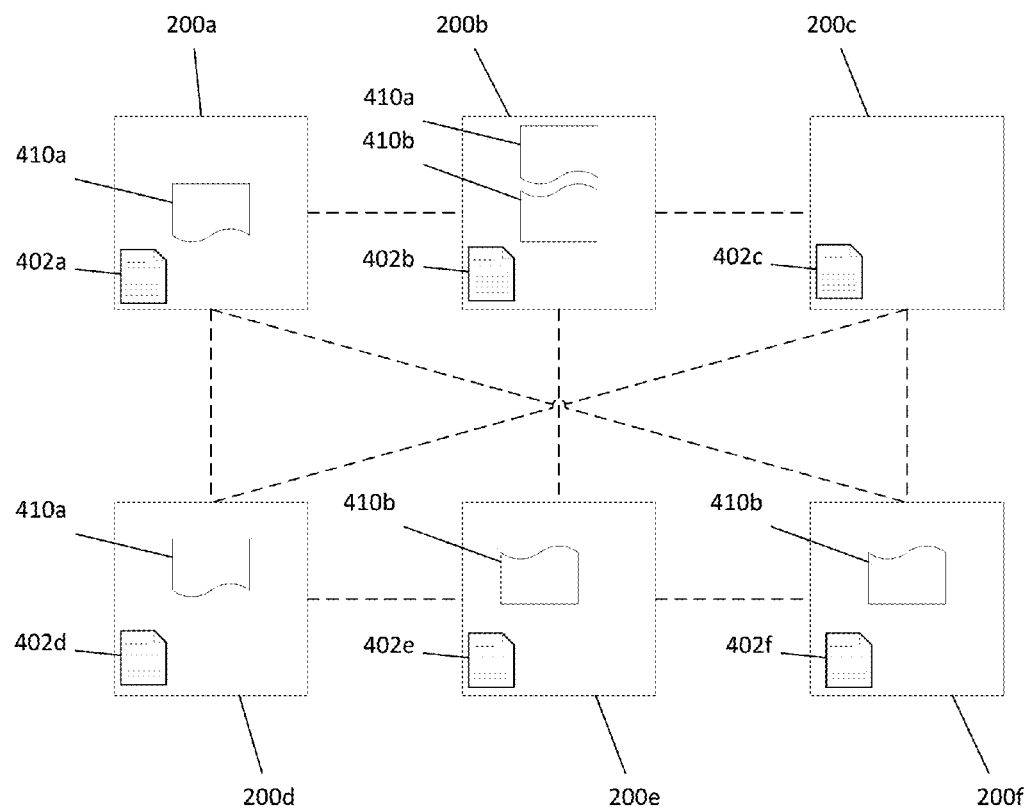
FIG. 6E is a schematic of a data file being stored on multiple clusters of resource modules.

As illustrated in FIG. 6D, the data file 400 may undergo segmentation, or "ticketing." As shown, the leader resource module 200e receives the data file 400 and divides the data file 400 in a specific number of segments or "tickets" 410a, 410b. The leader resource module 200e replicates the data file segments 410a, 410b and transfers the replicated data file segments 410a, 410b to separate resource modules 200 for storage. As illustrated in FIG. 6E, the copies of the first data file segment 410a are transferred and stored on three specific resource modules 200a, 200b, 200d. Copies of the second data file segment 410b are transferred and stored on three specific resource modules 200b, 200e, 200f. The data file 400 may be divided into any number of tickets. The data file 400 may be copied into any number of copies and stored on any number of resource modules 200. The separate segments 410a, 410b may be stored on separate resource modules 200 or the same resource modules 200. With the separate segments 410a, 410b stored in multiple locations, on multiple resource modules 200, the client device 300 will have access to the complete data file 400 even if one or more resource modules 200 become inactive in any manner or completely fail. In the preferred embodiment the leader resource module 200e determines on which resource modules 200 the data file segments 410a, 410b are stored. In another embodiment, the leader resource module 200e randomly selects specific resource modules 200 on which to store the data file segments 410a, 410b. The leader resource module 200e creates and distributes a location file 402a, 402b, 402c, 402d, 402e, 402f to each respective resource module 200a, 200b, 200c, 200d, 200e, 200f. The location file 402a, 402b, 402c, 402d, 402e, 402f details the exact location of each data file segment 410a, 410b on each resource module 200a, 200b, 200c, 200d, 200e, 200f. When a complete data file 400 is required by a resource module 200 or a client device 300, the resource module 200 refers to the respective location file 402a, 402b, 402c, 402d, 402e, 402f to determine the resource module 200 from which to select the data file segments 410a, 410b.

Figure 6F:
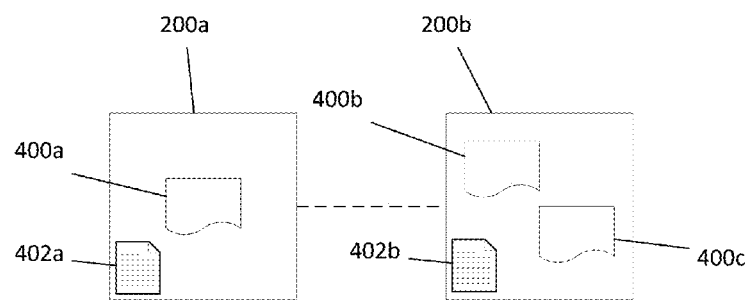
FIG. 6F is a schematic of a data file being stored on multiple clusters of resource modules.

The system is configured so that the replicated files automatically balance out across all resource modules 200 in a cluster when resource modules 200 are added to or taken from the cluster. Referring to FIG. 6F, the cluster starts with two resource modules 200a, 200b. On the two resource modules 200a, 200b are three copies of a data file 400a, 400b, 400c. The replication setting for the data file 400 is three so that there are three copies. Two of the copies 400b, 400c, reside together on one resource module 200b. If that resource module 200b has two hard drives the one copy of the data file 400b may reside on one hard drive and the other copy of the data file 400c may reside on the other hard drive. If one hard drive fails then the copy of the data file 400 may still be accessed from the other hard drive.

Figure 6G:
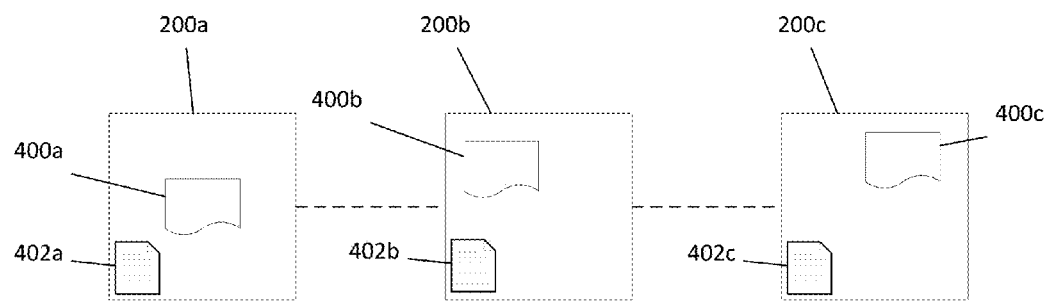
FIG. 6G is a schematic of a data file being stored on multiple clusters of resource modules.

As illustrated in FIG. 6G, if a third resource module 200c is added to the cluster then the system automatically rebalances copies of the data file 400a, 400b, 400c across all three resource modules 200a, 200b, 200c. This rebalancing promotes the optimal level of redundancy for the copies of the data file 400a, 400b, 400c. As shown in FIG. 6F, if the resource module 200b storing two copies of the data file 400b, 400c fails then two copies of the data file 400b, 400c are lost if the resource module 200b completely fails. By rebalancing as shown in FIG. 6G, only one copy of the data file 400b is lost if the second resource module 200b completely fails. In addition, the reverse process is also true. If a data file 400 is set to have three copies 400a, 400b, 400c which are spread across three resource modules 200a, 200b, 200c, and the third resource module 200c is removed, then the system will create a third copy of the data file 400c on the second resource module 200b, as shown in FIG. 6F.

Figure 6H:
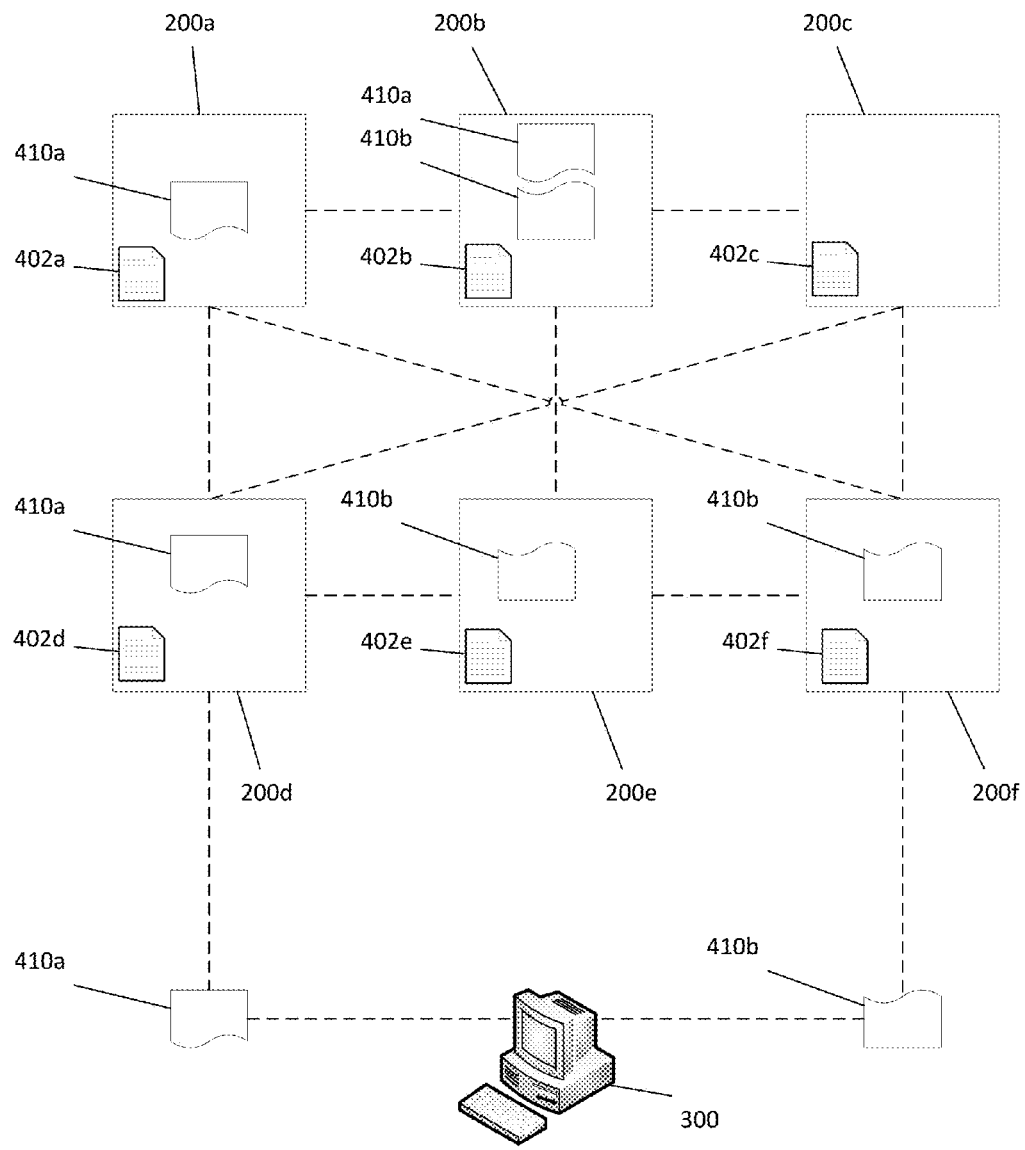
FIG. 6H is a schematic of a client computer retrieving a data file from multiple clusters of resource modules.

Referring to FIG. 6H, the system is displayed when a client device 300 requires access to a data file 400. In the illustration displayed, the data file 400 has been segmented and replicated into three copies of each data file segment 410a, 410b stored on five of the six resource modules 200a, 200b, 200d, 200e, 200f. The client 300 can obtain the first data file segment 410a directly from any of the three resource modules 200a, 200b, 200d on which it is stored. The client 300 can obtain the second data file segment 410b directly from any of the three resource modules 200b, 200e, 200f on which it is stored. As illustrated, the client 300 obtains the first data file segment 410a from one resource module 200d and the second data file segment 410b from another resource module 200f. The client 300 then combines the data file segments 410a, 410b to create the original data file 400. To complete this task the client 300 may have specific software, applications, or libraries to be able to recognize and compile the data file segments 410a, 410b. In this example, the client 300 may also have the ability to segment and replicate the data file 400 for storage on the respective resource modules 200.

Figure 6I:
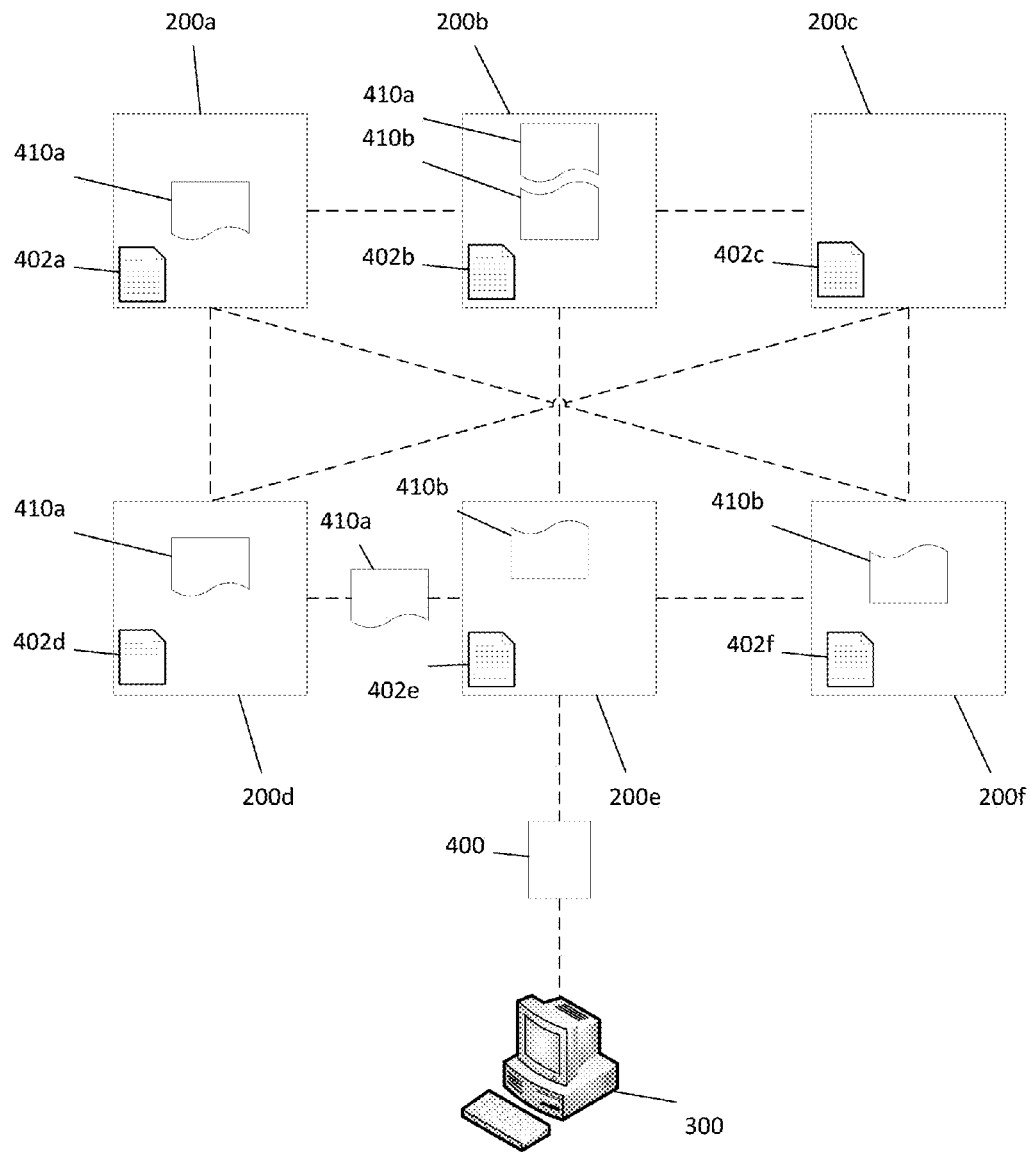
FIG. 6I is a schematic of a client computer retrieving a data file from multiple clusters of resource modules.

In another embodiment, as illustrated in FIG. 6I, the resource modules 200 reconstruct the data file 400 from the data file segments 410a, 410b and transfer the complete data file 400 to the client 300. In the example illustrated, when the client requests the data file 400, the lead resource module 200e obtains the first data file segment 410a from another resource module 200d, combines it with the second data file segment 410b stored on the lead resource module 200e, and transmits the reconstructed data file 400 to the client 300.

Figure 6J:
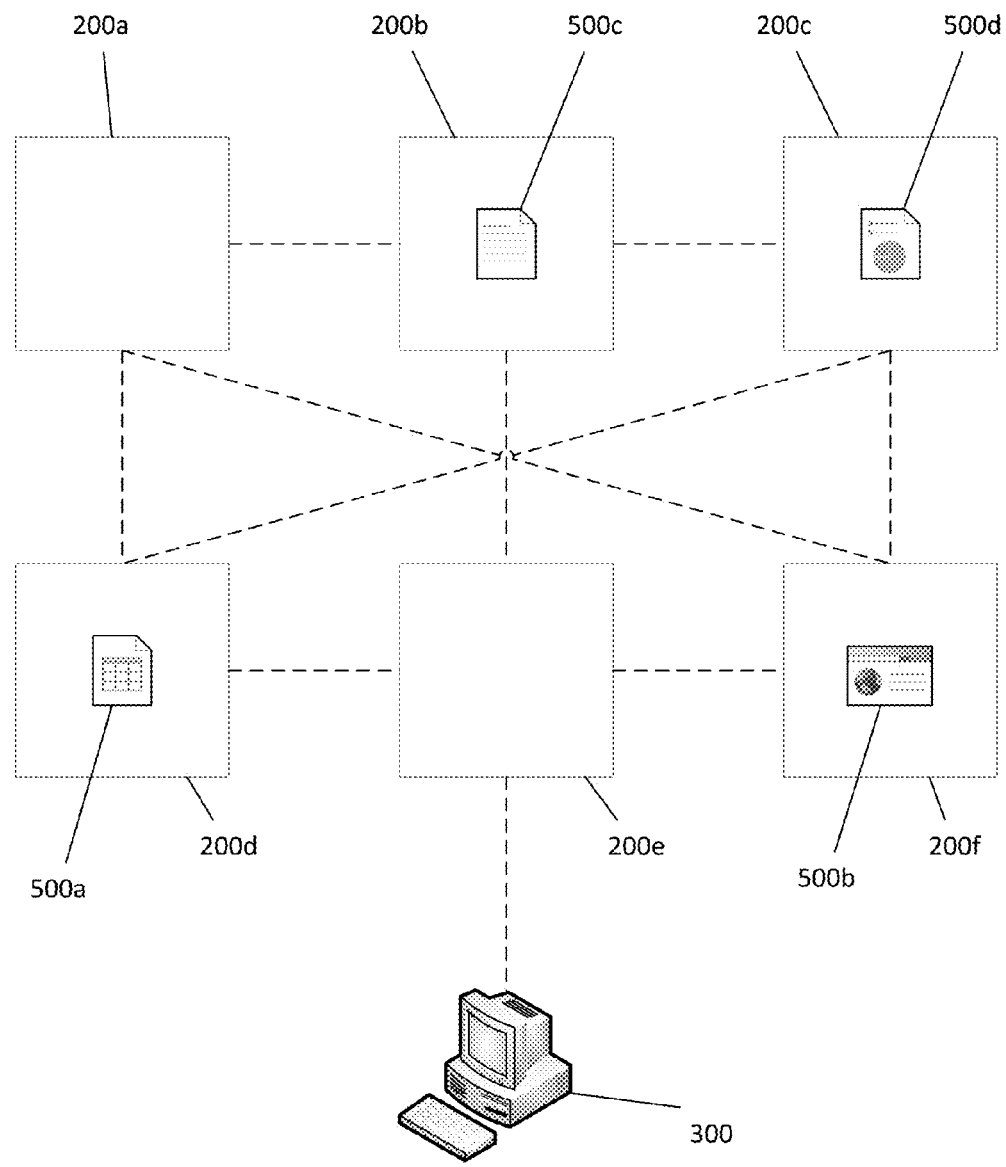
FIG. 6J is a schematic of a client computer accessing programs executed by the multiple clusters of resource modules.

As shown on FIG. 6J, a plurality of applications 500a, 500b, 500c, 500d may be stored on the respective resource modules 200a, 200b, 200c, 200d, 200d, 200f. Any of the applications 500a, 500b, 500c, 500d may be stored on any of the respective resource modules 200a, 200b, 200c, 200d, 200d, 200f. In another embodiment, all of the applications 500a, 500b, 500c, 500d are stored on a single resource module 200. The applications 500a, 500b, 500c, 500d may be any type of program application. For instance, the program may be a spreadsheet program 500a, an internet browser program 500b, a word processor program 500c, or a presentation program 500d. A user can access one of the applications 500a, 500b, 500c, 500d through a leader resource module 200e with a client device 300. In the preferred embodiment the resource module 200 storing the application 500 executes the program 500 and transmits the information to the client device 300. In another embodiment the program 500 is downloaded to the client device 300 and executed on the client device 300 when needed. In the preferred embodiment the code and instructions for executing an application 500 are ticketed and replicated across all of the resource modules 200. The client 300 initiates a request with the lead resource module 200e for execution of the application 500. The lead resource module 200e then determines the optimal resource module for execution of the application 200. For instance, as illustrated, the lead resource module 200e may determine that a specific resource module 200c is best suited for executing a word processor program 500d. The executing resource module 200c may then communicate directly with the client device 300 or may transmit the results of the execution of the word processing application 500d to the lead resource module 200e, which relays the information to the client device 300.

Figure 7:
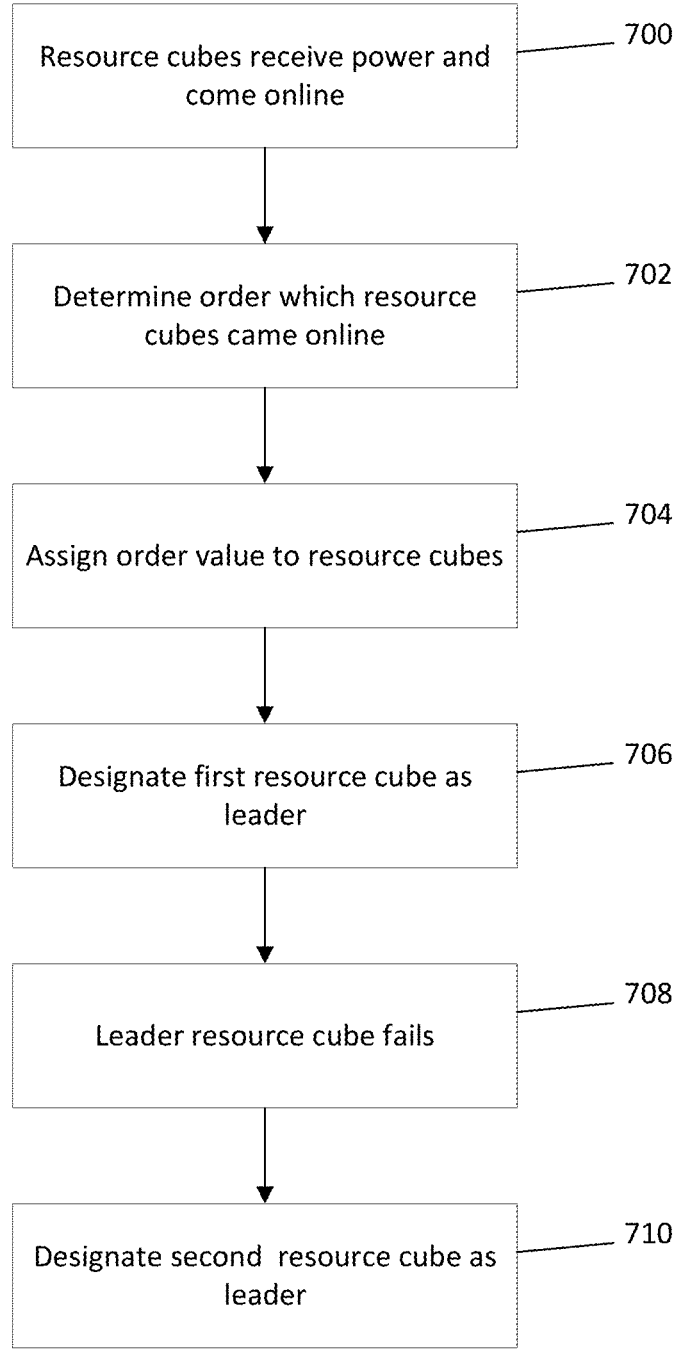
FIG. 7 is a schematic of the method of the organization of the resource modules.

Referring to FIG. 7, the method of assigning order to the resource modules is illustrated. First, the resource modules receive power and come online 700. Then the resource modules determine the order which the resource modules came online 702. This process may be done in a variety of manners. Each of the resource modules 200 may send a signal to all of the other resource modules 200. The first resource module 200 to send a signal without receiving any corresponding signals would be designated as number one. The resource module 200 which receives only the signal of the first resource module 200 before sending its own signal would be designated as resource module number two. The process would continue until the resource module 200 to receive all other signals before sending its corresponding signal would be designated as the last resource module 200. In this manner, the resource modules 200 may continue until each resource module 200 has sent a signal and received corresponding signals from the other resource modules 200 in the group. Alternatively, the resource modules 200 may be assigned a random number starting at one and proceeding until a number equal to the number of resource modules 200 coming online as a group. Through these processes, all of the resource modules 200 are assigned an order value 704. After each resource module 200 is assigned an order value then the first resource module 200 (that with the lowest number) is designated as the leader 706. Alternative methods may be used where a random resource module 200 is designated as the leader, the last resource module 200 is designated as the leader, or any other resource module 200 in a certain position is designated as the leader.

In the preferred embodiment the resource modules 200 are given an order value number in the order which they came online in the group. This provides a system of redundancy and easy coordination amongst the group of resource modules 200. In the event that the lead resource module fails 708, then the resource module 200 with the next order value is designated as the leader 710. As an illustration of the method and by no means limiting the scope of the invention, if five resource modules 200 boot up and come online in a specific order then the first resource module 200 to come online is given the order value of one, the second resource module 200 to come online is given the order value of two, the third resource module 200 to come online is given the order value of three, the fourth resource module 200 to come online is given the order value of four, and the fifth resource module 200 to come online is given the order value of five. The resource module 200 with the order value of one is designated as the leader of the cluster of resource modules 200. If the resource module 200 with the order value of one fails, disconnects, loses power, or otherwise ceases to function, then the resource module 200 with the order value of two is designated as the leader. If that resource module 200 has also failed then the process repeats until the resource module 200 which is online and has the lowest order value is designated as the leader.

In another embodiment of the invention, each resource module 200 selects a random number between a set range (such as 0 to 999,999) when booting up. The resource modules 200 in the cluster then communicate their random number with each other. The resource module 200 with the highest number is chosen as the leader. If the lead resource module 200 fails then the resource module 200 with the next highest number takes over as the leader. A resource module 200 may take over for the lead resource module 200 if the lead resource module 200 fails, is not responsive, or otherwise becomes unavailable, then the next resource module 200 takes over as leader. The lead resource module 200 may become unavailable if it is turned off, loses power, or if the processor becomes over used and is at or near 100% capacity. Once the resource module 200 which had become unresponsive reenters into communication with the other resource modules 200 in the cluster, the resource module 200 which had been the leader selects a new random number.

The resource modules 200 in the cluster communicate status and availability via a beacon signal sent to all other resource modules 200 in the cluster. The beacon signal can be sent at any interval of time between the resource modules 200. In the preferred embodiment, the beacon signal is sent every fifteen seconds. If one resource module 200 does not send a beacon signal then the other resource modules 200 determine that the resource module 200 not sending a beacon signal is unavailable or has failed. The other resource modules 200 can then automatically replicate and balance any data files 400 across the remaining resource modules 200 to maintain the preferred level of redundancy. The beacon signal contains the media access control address of the sending resource module 200, the internet protocol address of the sending resource module 200, and the alphanumeric identifier specific to the sending resource module 200. The receiving resource modules 200 can receive many signals from many devices. To ensure that the resource modules 200 recognize which devices are other resource modules 200 when creating a cluster, the resource module 200 filters all received signals for those containing an alphanumeric identifier identifying the sending device as a resource module 200. The alphanumeric identifier can be any length, contain any amount of letters, numbers, symbols, or combination thereof. The alphanumeric identifier is specific to resource modules 200 and permits a device receiving a signal from the resource module 200 containing the alphanumeric identifier to ascertain that the signal is specifically from a resource module 200.

Figure 8:
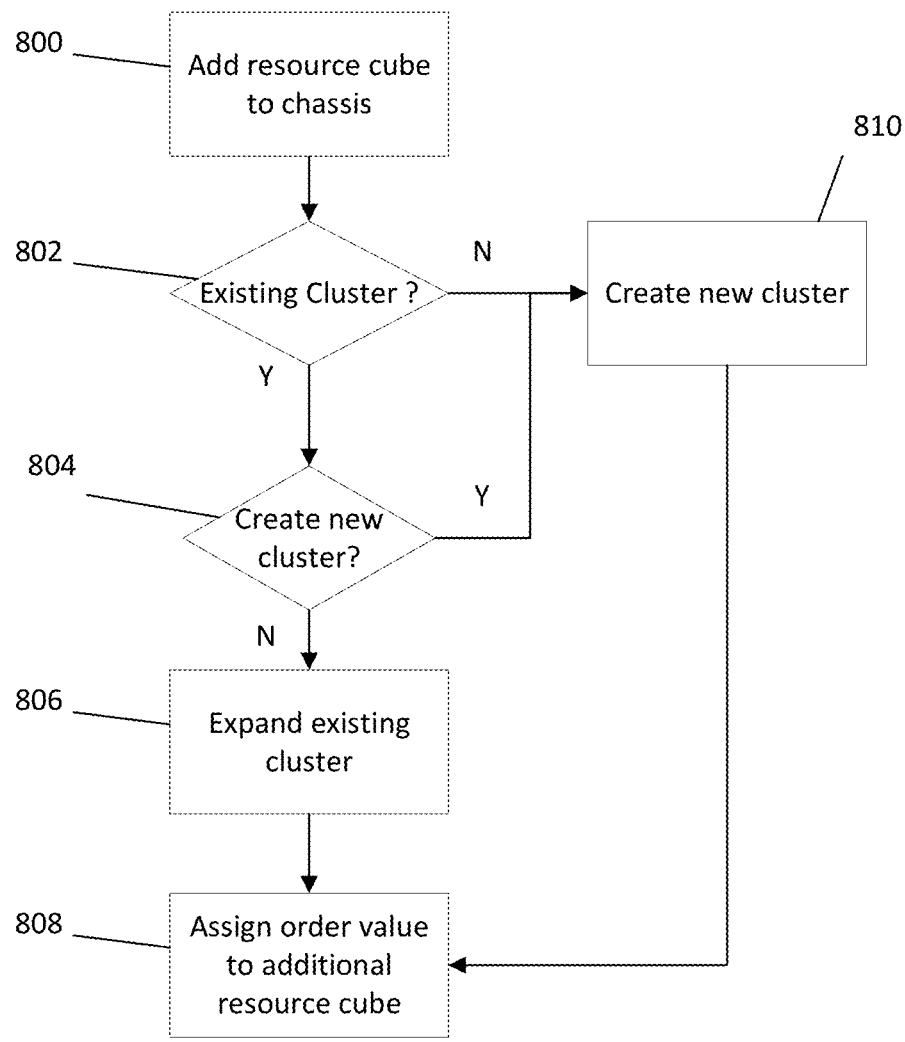
FIG. 8 is a schematic of the method of adding resource modules to a cluster.

Referring to FIG. 8, the process of adding resource modules 200 to a cluster is illustrated. First, a resource module 200 is added to the chassis 800. The system determines whether there is already an existing cluster which the resource module 200 may be joined to 802. If there is no preexisting cluster, then the system creates a new cluster 810. If there is already a preexisting cluster then a user is given the option to create a new cluster 804. If the user decides to create a new cluster then the system creates a new cluster 810. If the user decides not to create a new cluster then an existing cluster is expanded 806. After a new cluster is created 810, or after an existing cluster is expanded 806, then an order value is assigned to the newly added resource module 808. In the preferred embodiment the newly added resource module 200 is given an order value equal to the number of resource modules 200 in the cluster after the additional resource module 200 is added. For example, if the newly added resource module 200 is the fourth resource module 200 to be added to the cluster then the newly added resource module 200 is given an order value of four. In other embodiments, the additional resource module 200 may be given any order value. The additional resource module 200 may be given the lowest order value, taking over as the leader, and reordering the other resource modules 200 in the cluster.

Figure 9:
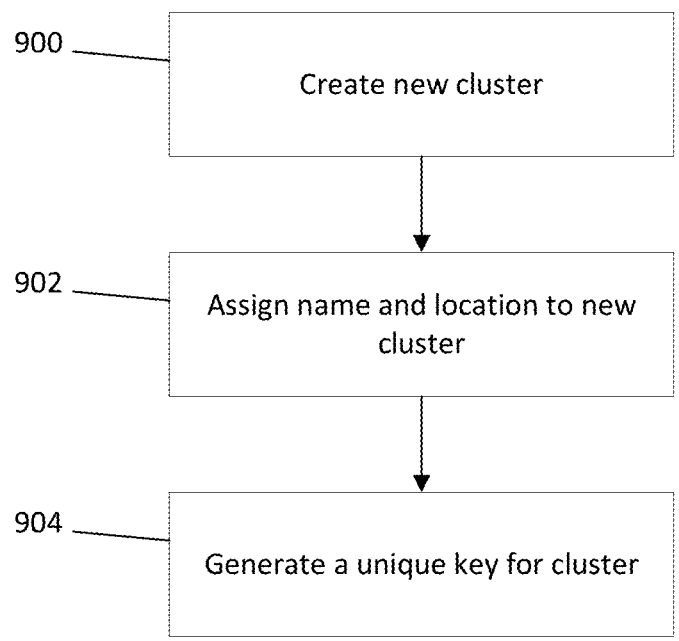
FIG. 9 is a schematic of the method of creating a new cluster.

As illustrated in FIG. 9, a user may easily track and manage a cluster through a user interface software system. The user interface software system may be present on a client device 300 or on a resource module 200. In the event that the resource module 200 has a display and user input, the user may perform the management on the resource module 200. A user first creates a new cluster 900. Then the user assigns a name and location to the new cluster 902. In some embodiments, the user may simply assign a name to the cluster. In some embodiment, the user may simply indicate a location to the cluster. The name and location assigned by the user may be any word, words, phrases, numbers, or combination of letters, symbols, and numbers chosen by the user. For instance, the user named John Doe, who places a cluster of resource modules 200 in his living room, may decide to name a specific cluster as "John Doe, Living Room." In the same example, his wife, Jane Doe, may place a second cluster of resource modules 200 in a home office. The wife may decide to name this cluster as "Jane Doe, Office." If Jane Doe utilizes a third cluster of resource modules 200, but positions them in the dining room then she may decide to name the third cluster as "Jane Doe, Living Room." In other embodiments, the users may decide to name the clusters based on purpose or function. For instance if John Doe operates a home based business then John Doe may choose to designate one cluster for business purposes, such as "John Doe, Business" and designate one cluster for personal use, such as "John Doe, Personal." Finally, the user may designate a unique key for the cluster 904. The unique key may be any alphanumeric string of characters either chosen by the user or randomly generated by the user interface software. The unique key provides a security measure to the access or management of the resource modules 200. For instance, a user may be required to present the unique key from a client device 300 prior to being able to access the cluster or add or remove a resource module 200 from the cluster.

Figure 10:
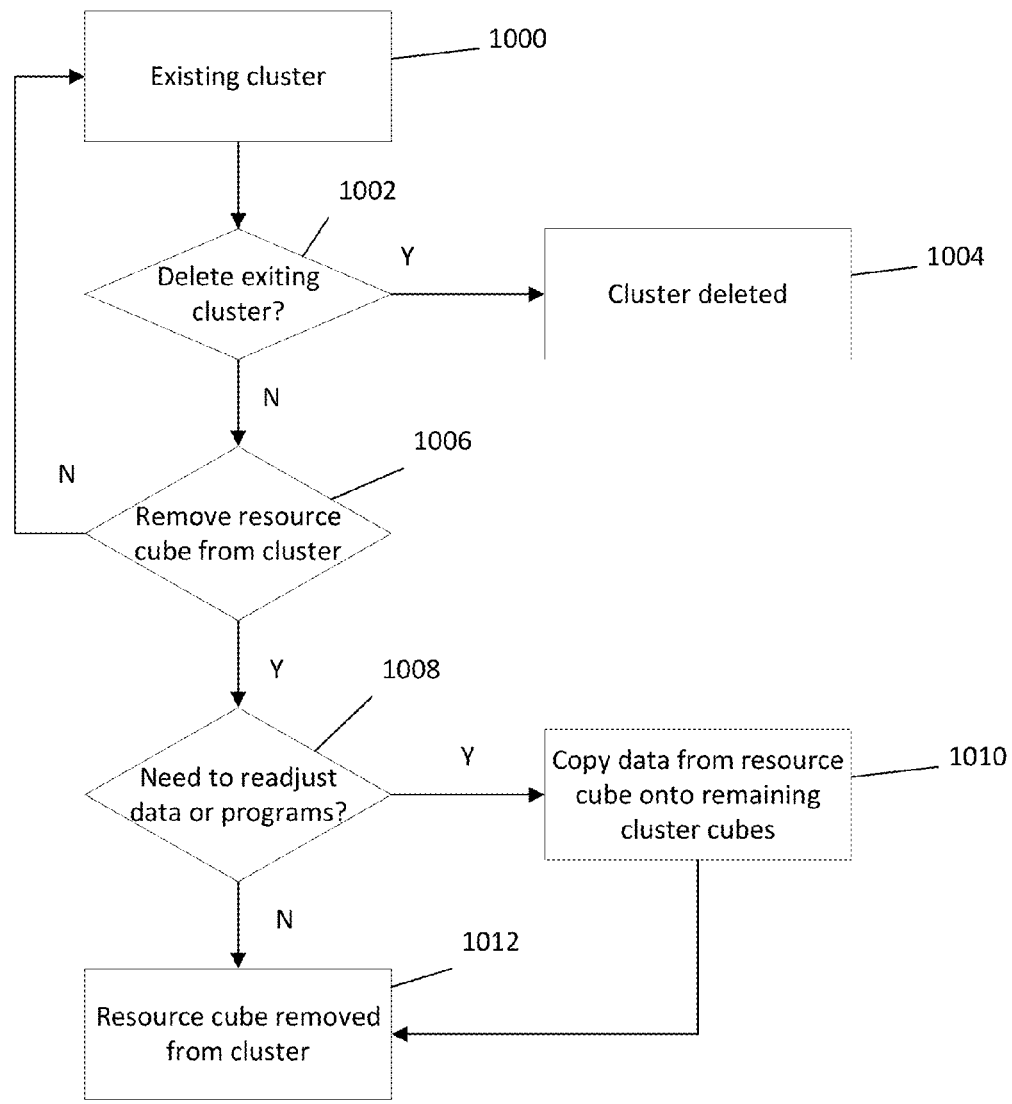
FIG. 10 is a schematic of the method of removing a resource module from a cluster.

Referring to FIG. 10, the process or removing a resource module 200 from a cluster, or deleting an entire cluster is illustrated. The process begins with an existing cluster 1000. The user may then decide whether or not to delete the existing cluster 1002. If the user decides to delete the entire cluster then the cluster is deleted 1004. If the user decides not to delete the entire cluster then the user is given the option to decide whether or not to remove a specific resource module from the cluster 1006. If the user decides not to remove the resource module 200 then the cluster remains an existing cluster 1000. If the user decides to remove the resource module 200 from the cluster then the user if given the option to decide whether or not there is a need to readjust the data or software applications on the resource module 200 to be removed to other resource modules 200 prior to removal 1008. If the user decides not to the readjust the data or applications then the resource module 200 is removed from the cluster 1012 without transferring data to other resource modules 200 remaining in the cluster. If the user decides to readjust the data or software applications then the data or software applications on the resource module 200 to be removed are copied onto the resource module 200 remaining in the cluster 1010. In some embodiments the decisions of copying data or software may be performed automatically by the operating system executed by the resource modules 200.

If a cluster is deleted, then the resource modules 200 in the cluster may be individually reassigned to new clusters, turned off, removed from the chassis 100, or operated individually. If a resource module 200 is removed from the cluster then that resource module may be reassigned to a new cluster, turned off, removed from the chassis 100, or operated individually.

Figure 11:
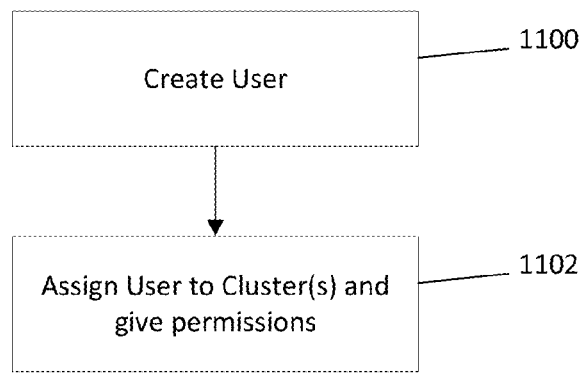
FIG. 11 is a schematic of the method of adding a user.

Referring to FIG. 11, the user interface may also permit an administrator to create a user account 1100. The administrator may assign the user to a specific cluster or clusters and give other permissions to the user 1102. The user may be given full access to all clusters or only a specific cluster. The user may have full permissions to act as an administrator, or have limited access with no permissions to create or change accounts for other users.

Figure 12:
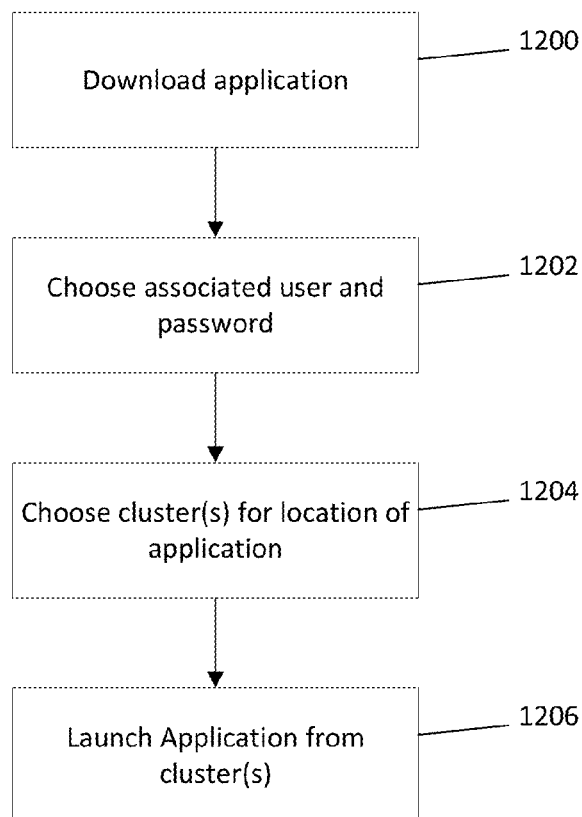
FIG. 12 is a schematic of the method of running a program from a cluster.

Referring to FIG. 12, the method of storing and executing an application is displayed. First a user downloads an application 1200. If the user is an administrator, the user can choose which users have the ability to execute the application, and can select a password required for the execution of the program 1202. The user can then launch the application from the cluster of resource modules 1206.

Figure 13:
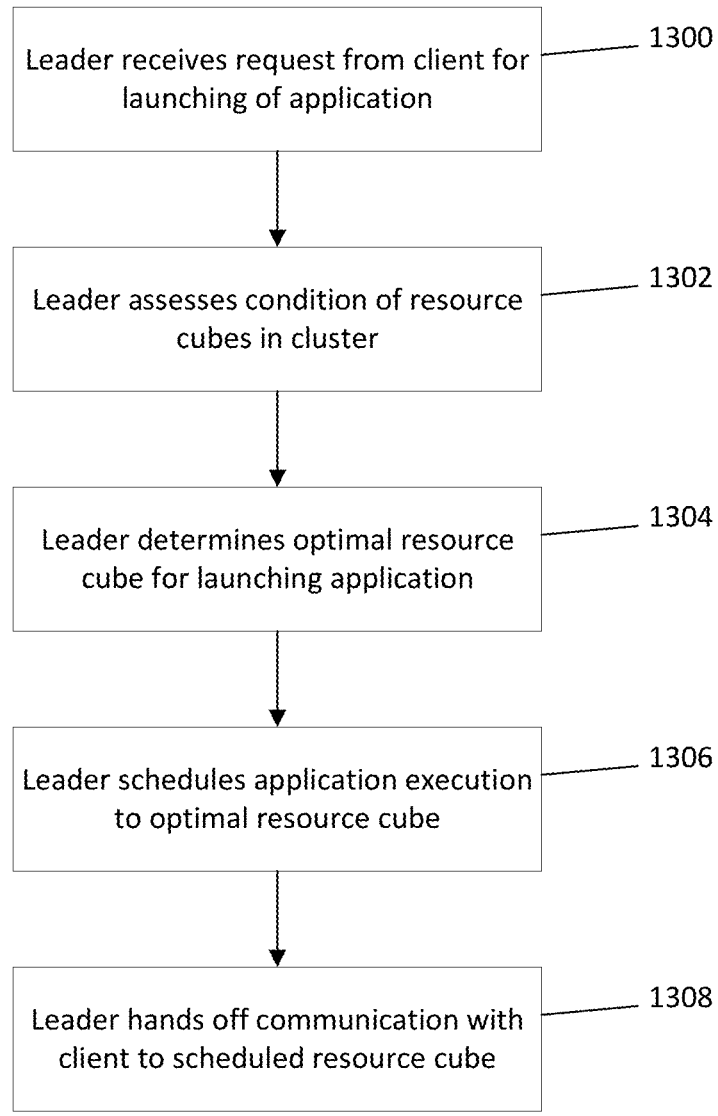
FIG. 13 is a schematic of the method of launching an application from a cluster.

Referring to FIG. 13, the method of the resource modules launching an application is illustrated. First the lead resource module receives a request from a client device to launch an application 1300. The leader then assesses the condition of each of the resource modules 1302. Primarily the lead resource module determines the free memory available on each resource module, the memory requirements of the requested application, the number of applications already running on each resource module, the CPU availability on each resource module, the CPU requirement of the requested application, the CPU architecture of each resource module, the network I/O capacity of each resource module, the network I/O requirements of the requested application, and the cluster leader election status of each resource module. After assessing the resource modules, the lead resource modules determines the optimal resource module for launching the application 1304. The lead resource module then schedules the application for execution on the selected optimal resource module 1306. The lead resource module then hands off the communication with the client device to the scheduled resource module 1308.

Figure 14:
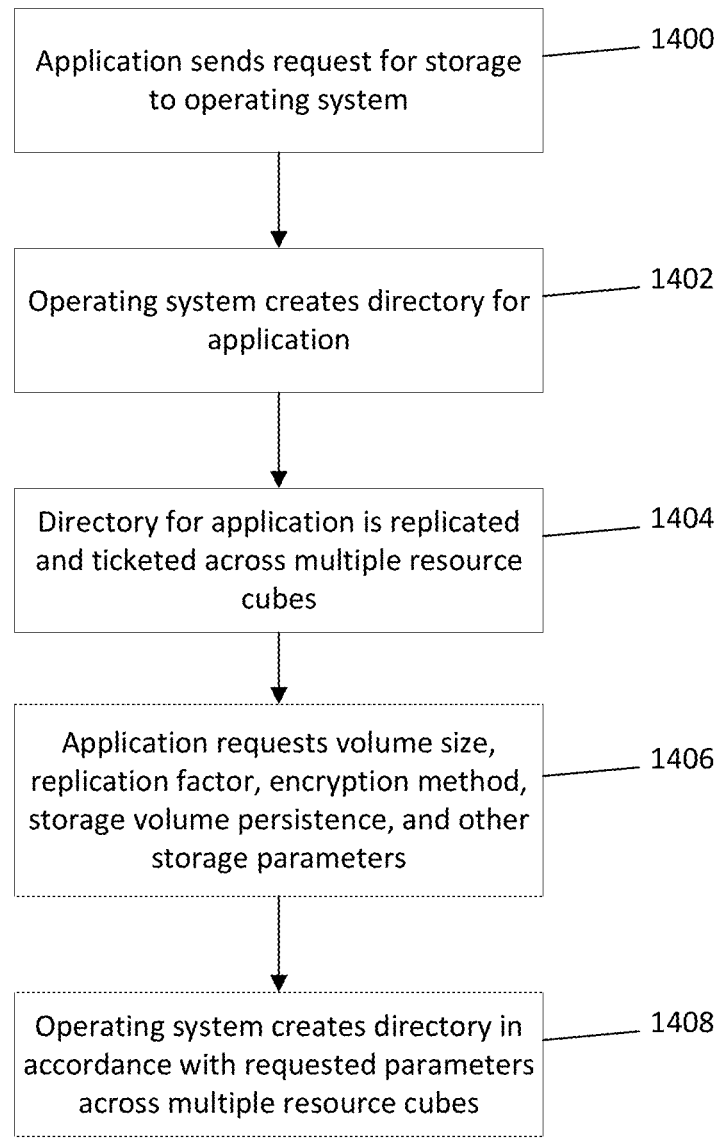
FIG. 14 is a schematic of the method of storing information for an application on a cluster.

Referring to FIG. 14, the method of the management for the launched application is displayed. The application sends a request for storage to the operating system of the resource modules 1400. The operating system creates a storage volume for storage for the application 1402. The storage volume for the application is ticketed and replicated across multiple resource modules 1404. The application can request a specific volume size, a replication factor for the files of the application, an encryption method, the storage volume persistence after the application ceases, and any other storage parameters 1406. In other embodiments, these parameters may be set at a default setting by the resource modules or may be set at specific settings by the user of the resource modules or application. The operating system then creates the storage volume in accordance with the requested parameters across multiple resource modules 1408.

Figure 15:
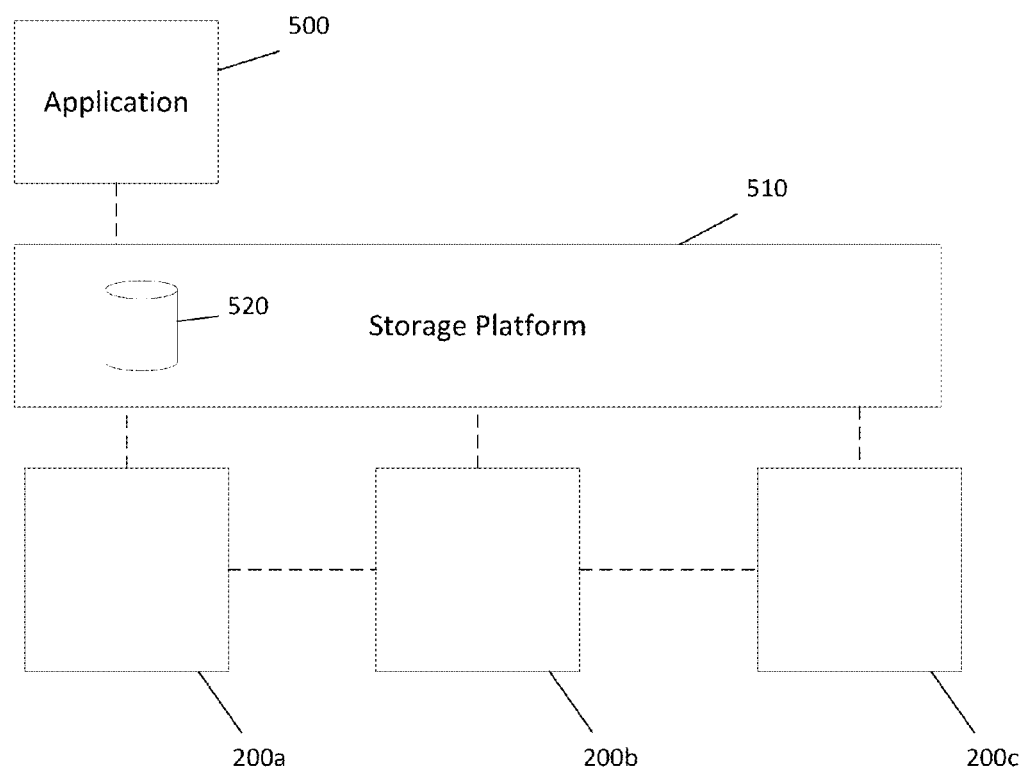
FIG. 15 is a schematic of an application storing information on a cluster.

The creation and storage of the storage volume is further illustrated in FIG. 15. In the example illustrated, a cluster is made up of three resource modules 200*a*, 200*b*, 200*c*. The resource modules 200*a*, 200*b*, 200*c* execute a storage platform application 510 as part of the operating system of the resource modules 200*a*, 200*b*, 200*c*. The storage platform application 510 is visible and accessible across all resource modules 200*a*, 200*b*, 200*c*. Application 500 communicating with the resource modules 200*a*, 200*b*, 200*c* interacts with the storage platform application 510. When requested, the storage platform application 510 creates a storage volume 520. The storage volume 520 is ticketed and replicated across all of the resource modules 200*a*, 200*b*, 200*c*. The storage volume 520 may persist across the storage modules 200*a*, 200*b*, 200*c* after the application 500 ceases to be executed. If a user relaunches the application 500, the application 500 may be executed on a different resource module 200 than the prior time of execution. Even if the application 500 is executed by a separate resource module 200, the application has access to the storage volume 520 as previously created. In other embodiments the storage volume 520 is ephemeral and is deleted when the application 500 is closed and ceases operation.

Figure 16A:
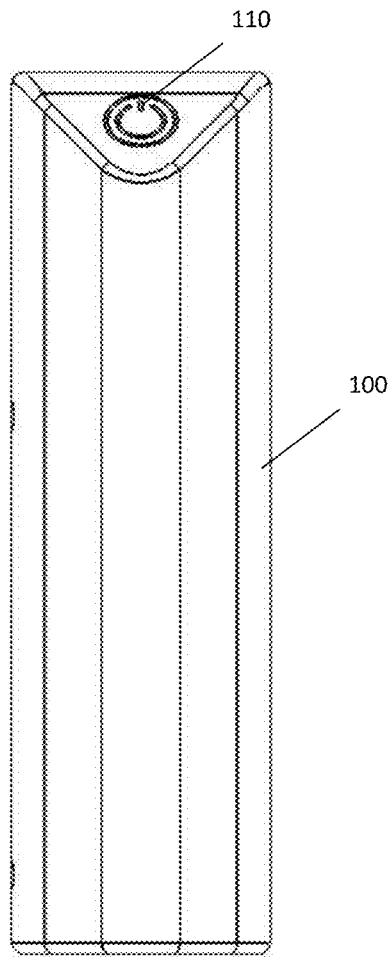
FIG. 16A is a front view of a chassis.
Figure 16B:
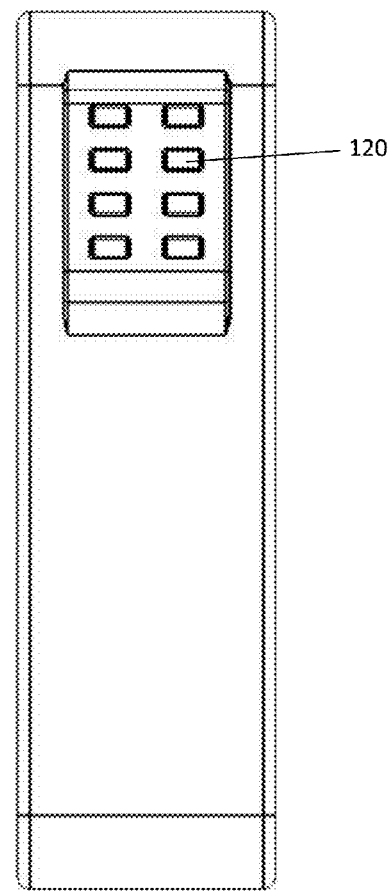
FIG. 16B is a back view of a chassis.
Figure 16C:
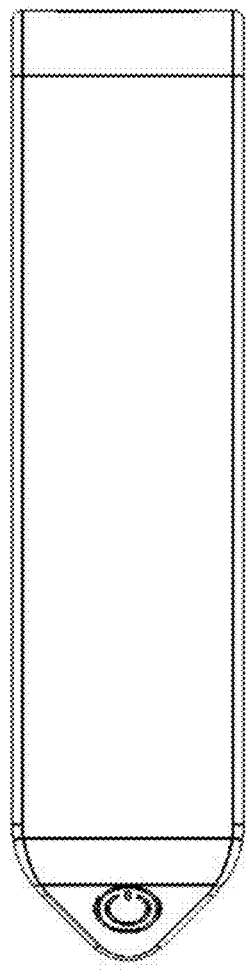
FIG. 16C is a top view of a chassis.
Figure 16D:
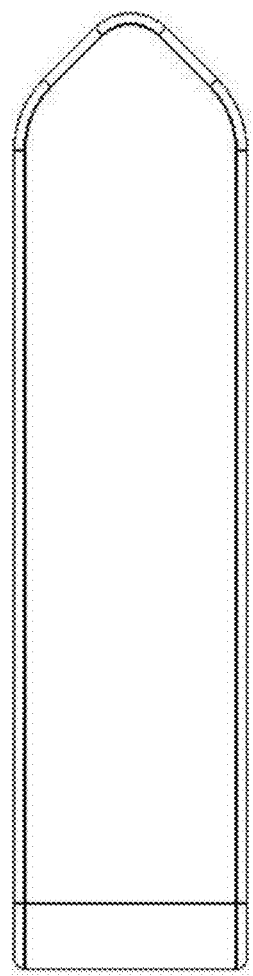
FIG. 16D is a bottom view of a chassis.
Figure 16F:
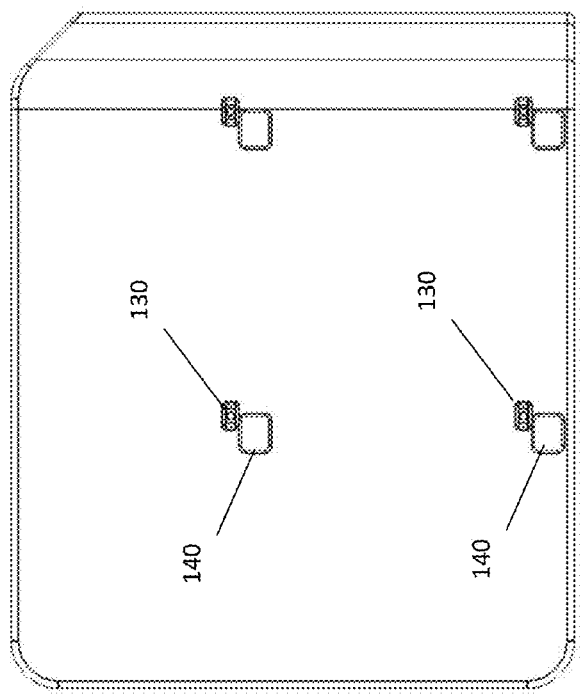
FIG. 16F is a left side view of a chassis.
Figure 16E:
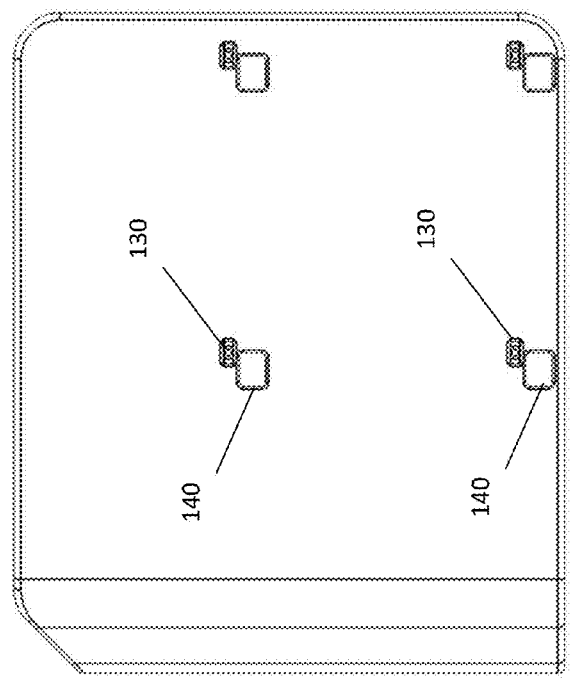
FIG. 16E is a right side view of a chassis.
Figure 16G:
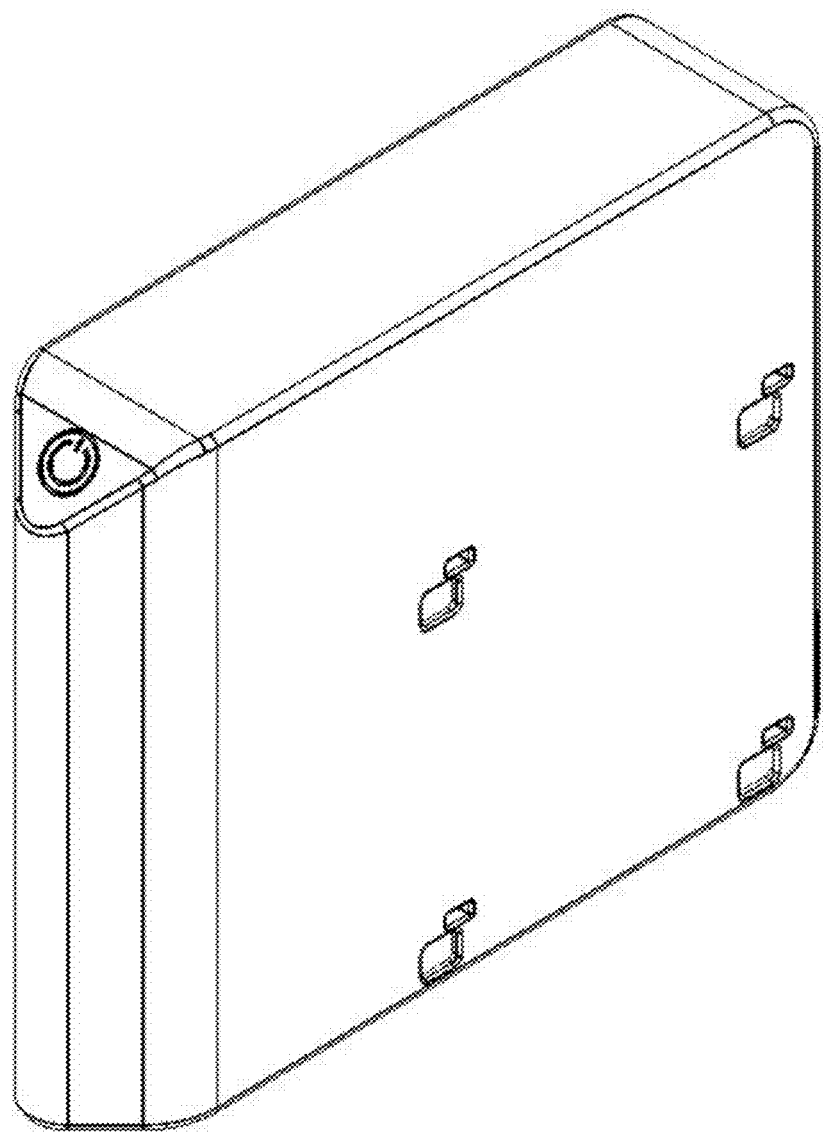
FIG. 16G is a perspective view of a chassis.
Figures 17A, 17B:
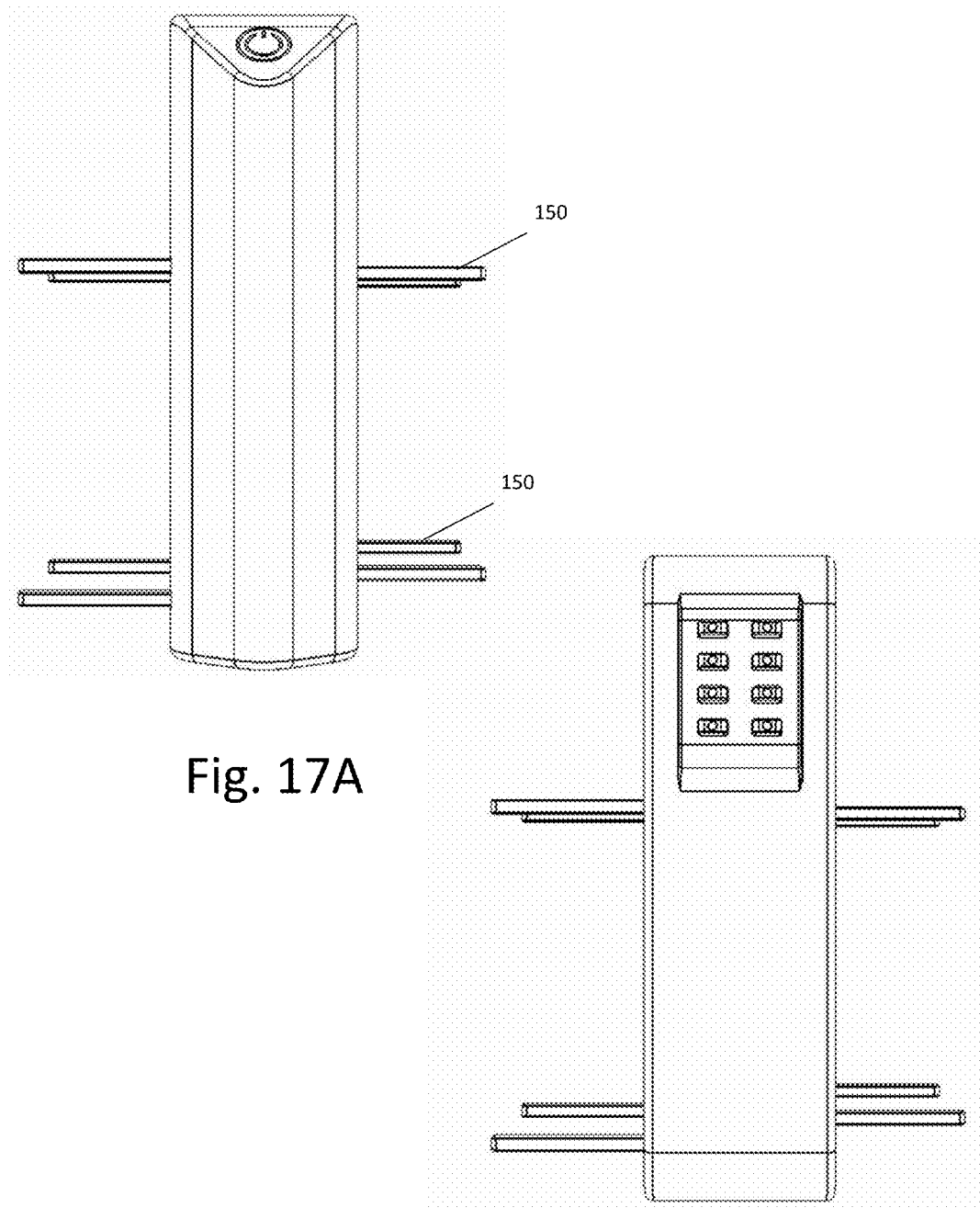
FIG. 17A is a front view of a chassis.
FIG. 17B is a back view of a chassis.
Figure 17C:
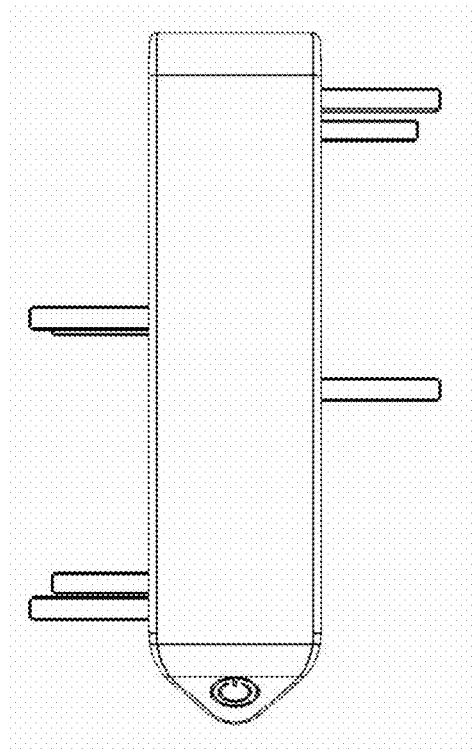
FIG. 17C is a top view of a chassis.
Figure 17D:
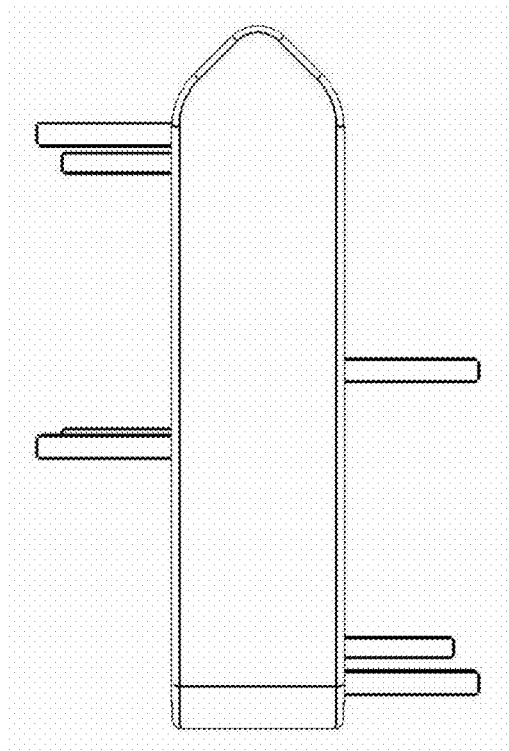
FIG. 17D is a bottom view of a chassis.
Figure 17F:
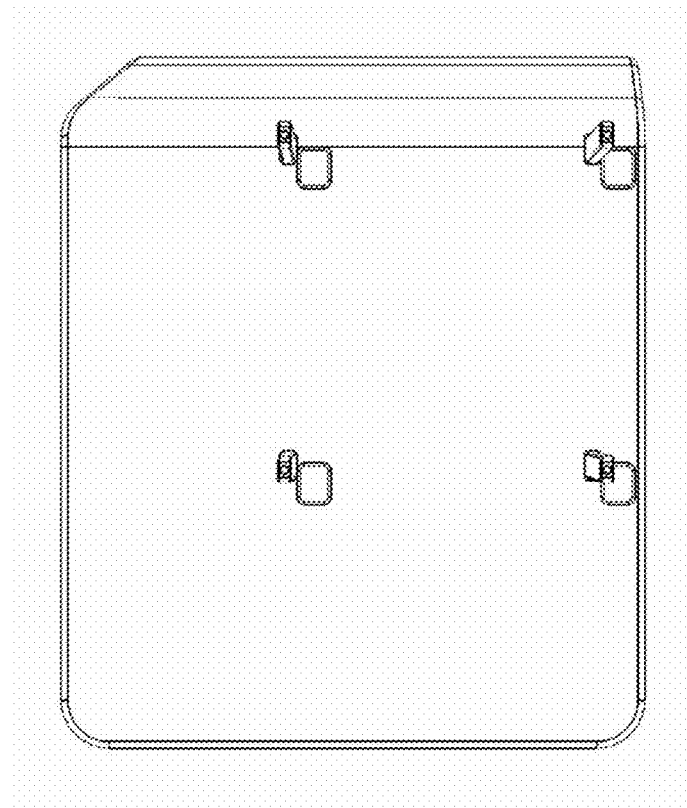
FIG. 17F is a left side view of a chassis.
Figure 17E:
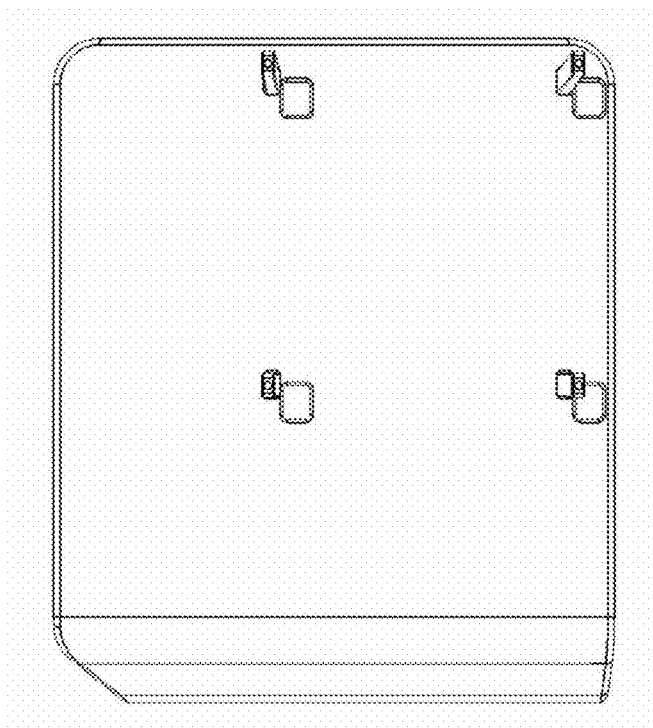
FIG. 17E is a right side view of a chassis.
Figure 17G:
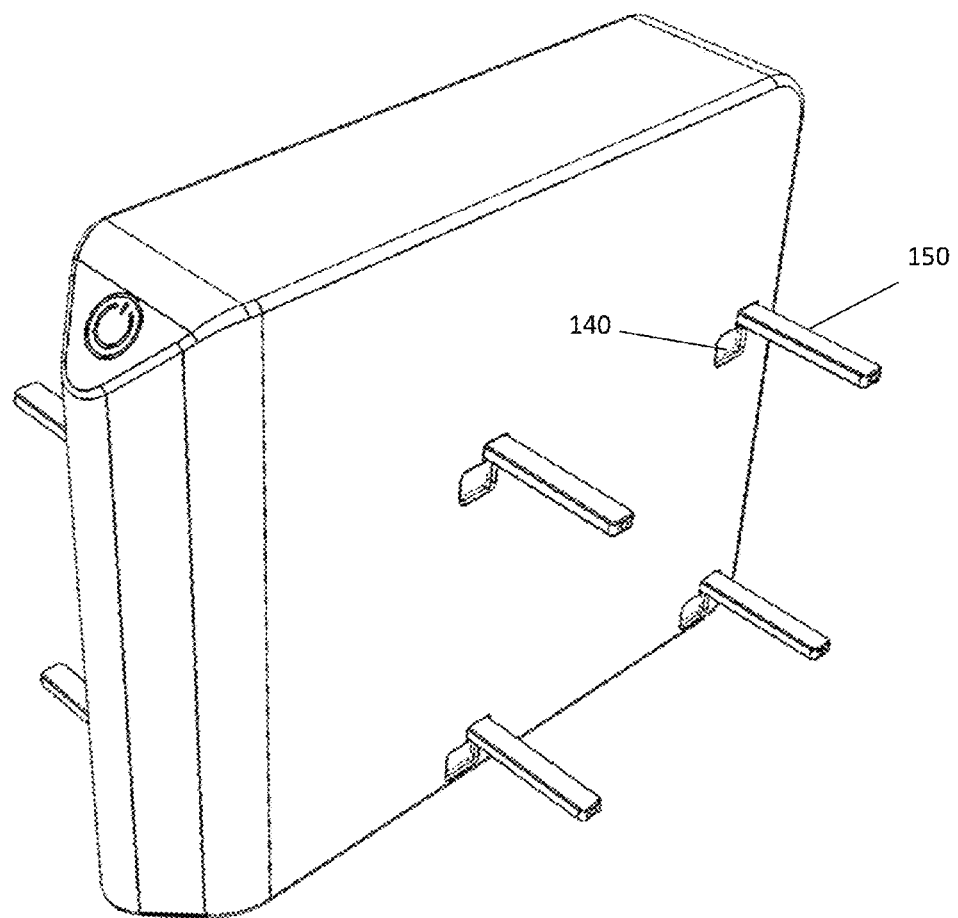
FIG. 17G is a perspective view of a chassis.
Figure 18D:
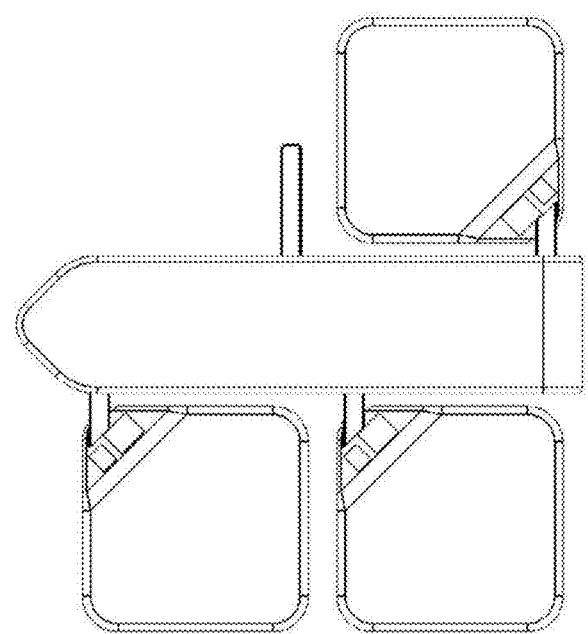
FIG. 18D is a bottom view of a chassis with attached resource modules.
Figure 18C:
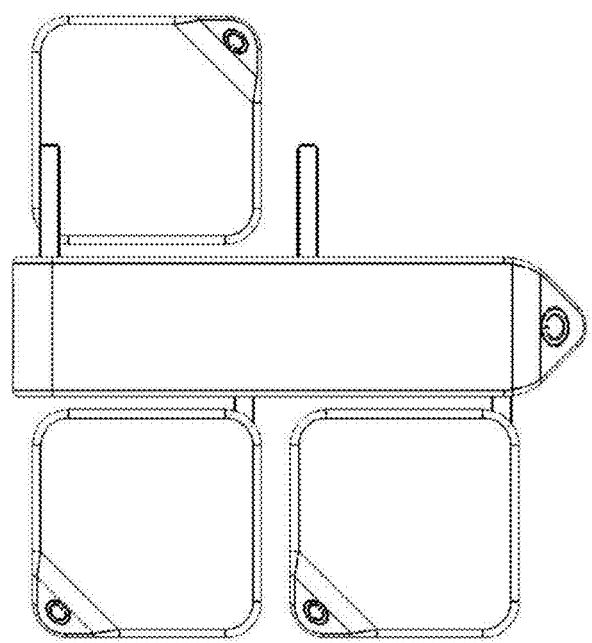
FIG. 18C is a top view of a chassis with attached resource modules.
Figure 18F:
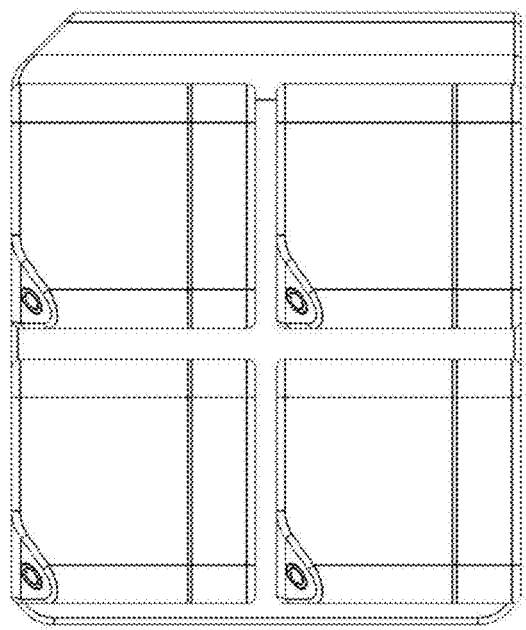
FIG. 18F is a left side view of a chassis with attached resource modules.
Figure 18E:
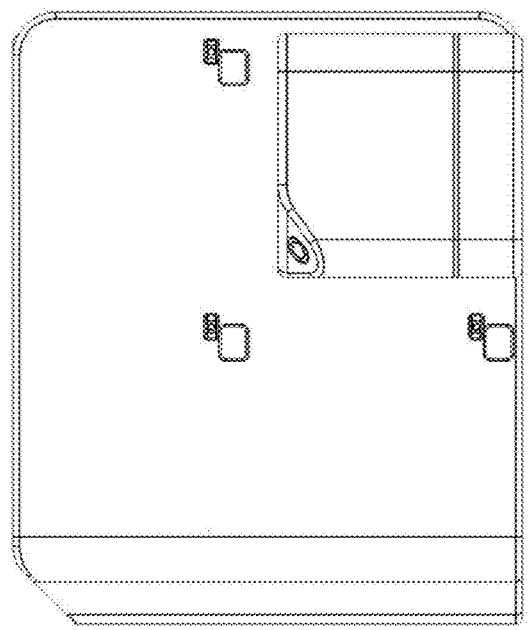
FIG. 18E is a right side view of a chassis with attached resource modules.
Figure 18G:
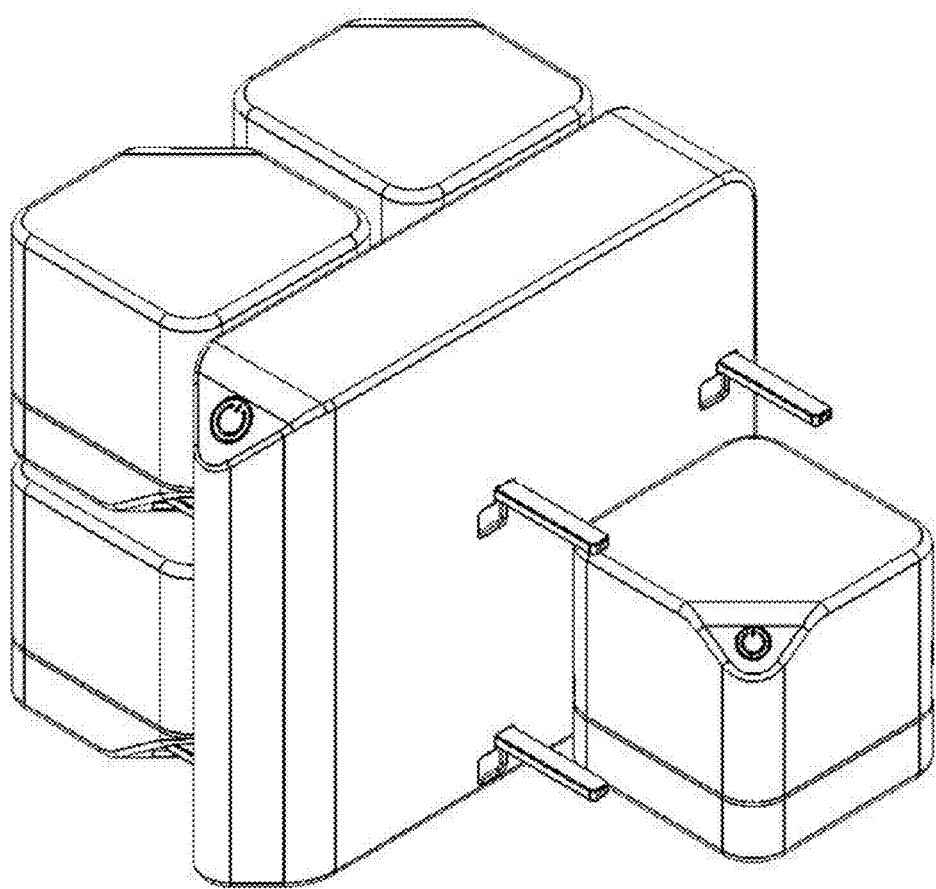
FIG. 18G is a perspective view of a chassis with attached resource modules.
Figure 19A:
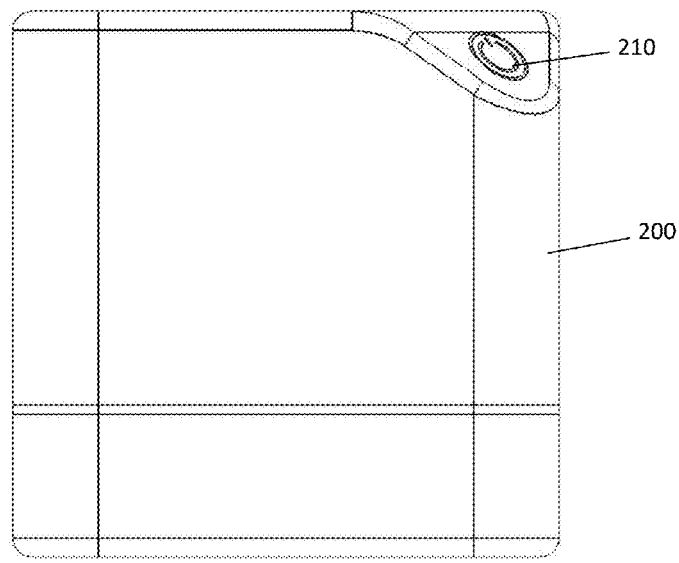
FIG. 19A is a front left side view of a resource module.
Figure 19B:
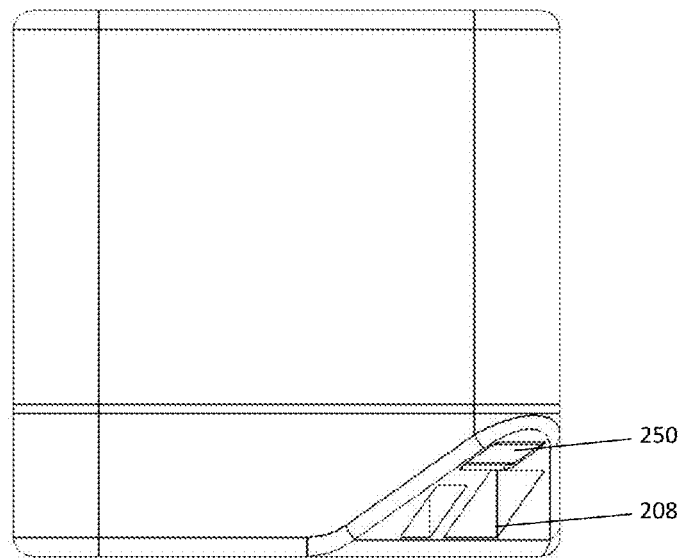
FIG. 19B is a back left side view of a resource module.
Figure 19C:
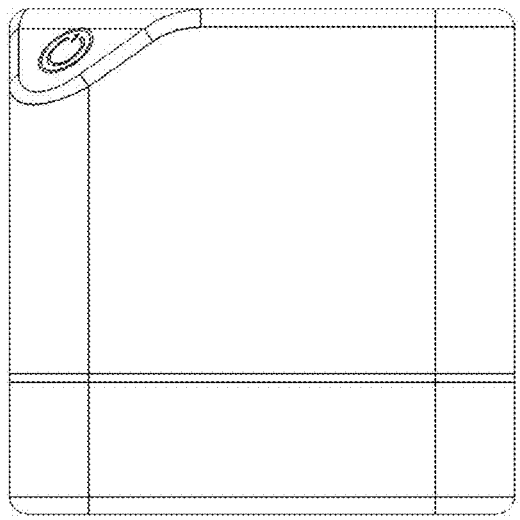
FIG. 19C is a front right side view of a resource module.
Figure 19D:
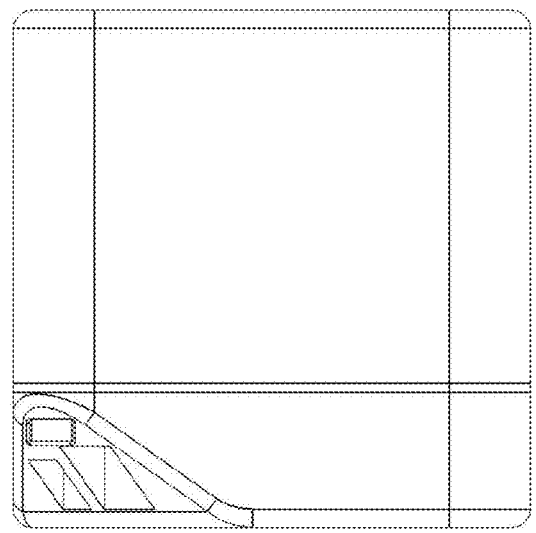
FIG. 19D is a back right side view of a resource module.
Figure 19E:
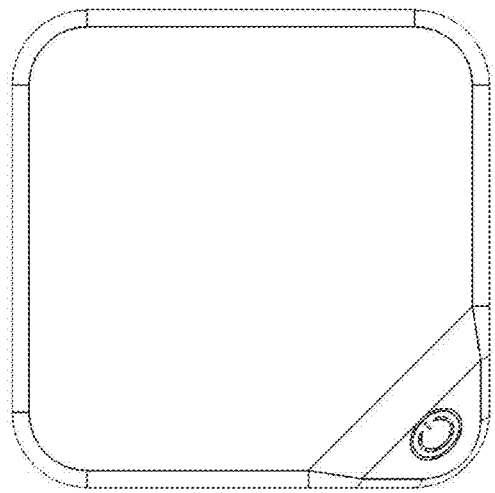
FIG. 19E is a top view of a resource module.
Figure 19F:
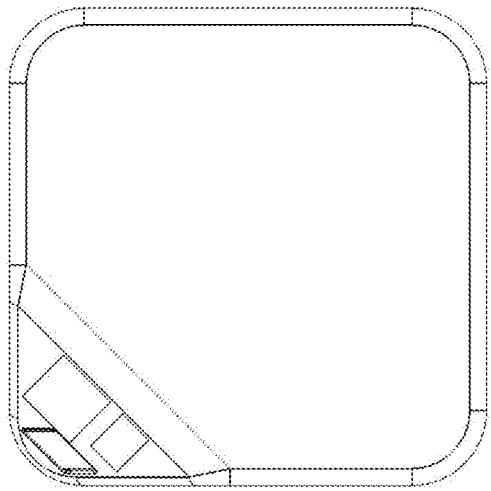
FIG. 19F is a bottom view of a resource module.
Figure 19G:
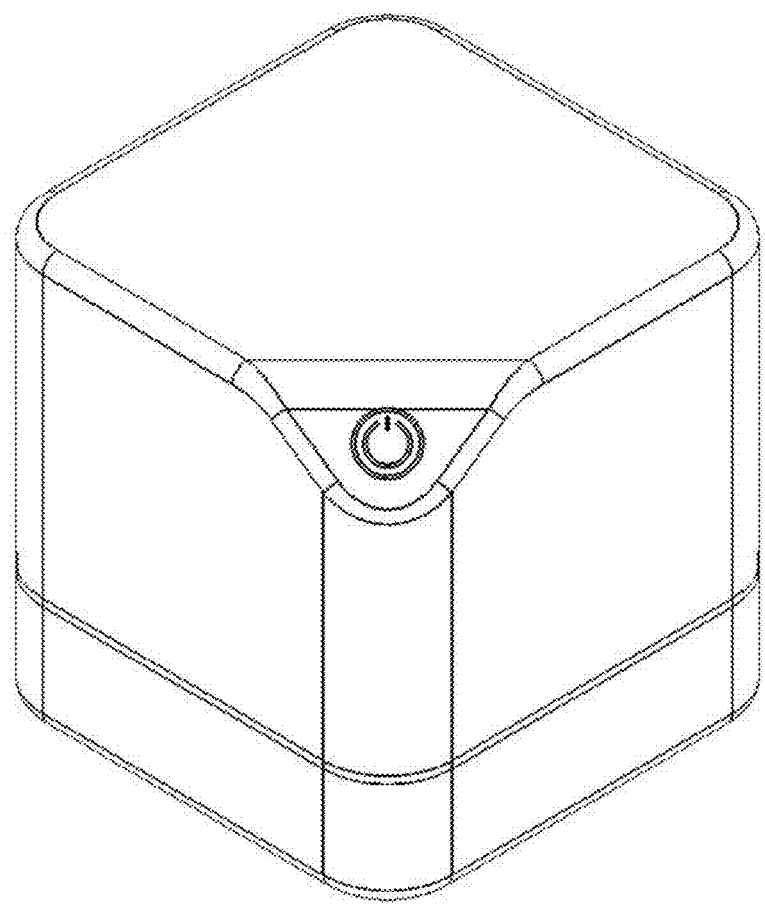
FIG. 19G is a perspective view of a resource module.

The system may be created in many versions and embodiments. As shown in FIG. 16A through FIG. 16G, a preferred embodiment of the chassis 100 is displayed. In this embodiment, the chassis 100 has a power button 110 located on the upper front panel of the chassis 100, as shown in FIG. 16A, which can be used to turn on and turn off power to the chassis 100. In the preferred embodiment, turning off power to the chassis 100 turns off all power to all resource modules 200 attached to the chassis 100. As shown in FIG. 16B, the chassis 100 has a plurality of storage slots 120 used to store arms 150. The arms 150 can be attached to the external body of the chassis 100 as illustrated in FIG. 17A through 17B. The arms 150 are external protrusions configured for securing and connecting resource modules 200 to the chassis 100. The arms 150 may be configured to connect physically to the resource module 200. In other embodiments the arms 150 may be magnetized to provide a magnetic hold on the resource module 200. In other embodiments the arms 150 provide an electrical connection to the resource modules 200. Each arm 150 is physical attached to the body of the chassis 100 at an arm connection point 130 as shown in FIG. 16E. Furthermore, the chassis 100 may have a plurality of Ethernet ports 140 to provide power to, and wired communication with, each resource module 200. As illustrated in FIG. 18A through 18G, a plurality of resource modules 200 can be removably secured to the arms 150 of the chassis 100. The preferred embodiment of the resource module 200 is illustrated in FIG. 19A through FIG. 19G. The resource module 200 can have a power button 210 which can be used to turn off and turn on power to that specific resource module 200 without affecting power to other resource modules 200 attached to the chassis 100. Disposed on the back corner of the resource module 200 is an arm receptor 250 which is configured to receive the arm 150. The arm receptor 250 may have a physical locking mechanism to secure the resource module 200 onto the arm 150. In another embodiment the arm receptor 250 is magnetized to cause a magnetic attraction to the arm 150. Furthermore, the resource module 200 has an Ethernet port 208 which is disposed adjacent to, and connected with, the Ethernet port 140 of the chassis 100 when the resource module 200 is attached to the chassis 100.

The chassis 100 and resource module 200 can be constructed out of any material or combination of materials. For instance the chassis 100 and resource module 200 can be made out of any thermoplastic, such as polypropylene, polyethylene, high density polyethylene, polystyrene, or any other formed thermoplastic. In addition, the chassis 100 and resource module 200 can be constructed out of metal, such as aluminum, steel, copper, bronze, silver, gold, or any other metal. Additionally, the chassis 100 and resource module 200 can be constructed out of any combination of thermoplastic and metal. In addition the chassis 100 and resource module can be constructed out of other materials, or combinations of materials, such as wood or glass or any other commercially available material.

What has been described above includes examples of the claimed subject matter. It is, of course, not possible to describe every conceivable combination of components or methodologies for purposes of describing the claimed subject matter, but one of ordinary skill in the art can recognize that many further combinations and permutations of such matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module, which may reside on a tangible, non-transitory computer-readable storage medium. Tangible, non-transitory computer-readable storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a tangible, non-transitory machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

The invention claimed is:

1. A method for organizing and storing data for a software application comprising
   a. on a first computer resource module communicatively coupled to one or more second computer resource modules, said first computer resource module executing a software application
      i. wherein said first computer resource module and each of said one or more second computer resource modules comprise an external housing having a top side, a bottom side, a front side, a back side, a left side, and a right side, one or more microprocessor units, one or more nonvolatile memory storage units, one or more transceivers, one or more Ethernet ports
         1. wherein said first computer resource module and each of said one or more second computer resource modules are coupled to a chassis, wherein said chassis comprises a body and one or more Ethernet ports disposed in said body;
         2. wherein each of said one or more Ethernet ports disposed in said first computer resource module and each of said second computer resource modules are communicatively coupled to one or more Ethernet ports in said chassis;
         3. wherein said first computer resource module and said one or more second computer resource modules are communicatively coupled to form a cluster;
   ii. said method comprising
      1. receiving a request from an application for the creation of an application specific data storage volume;
      2. creating an application specific data storage volume stored on one or more memory units of said first computer resource module and respectively on one or more memory units of one or more said second computer resource modules;
         storing a portion of said application specific data storage volume on one or more memory units of said first computer resource module;
      3. storing a portion of said application specific data storage volume respectively on one or more memory units of said one or more second computer resource modules;
      4. maintaining said application specific data storage volume after said first computer resource module has terminated the execution of said application;
      5. wherein, in the event said first computer resource module is removed from said cluster or disabled, a complete set of application stored data is available for download from a remaining number of computer resource modules in said cluster;
      6. wherein, in the event one of said one or more second computer resource modules is removed from said cluster or disabled, a complete set of application stored data is available for download from a remaining number of computer resource modules in said cluster.

2. The method as in claim 1 further comprising
   a. receiving a replica count request for data stored in the application specific data storage volume from said application;
   b. receiving a requested storage volume size for said application specific data storage volume from said application;
   c. receiving a persistence request for said application specific data storage volume from said application;
   d. receiving an encryption method from said application;
   e. receiving an encryption key from said application;
   f. encrypting each copy of said two or more data file segments in accordance with said encryption method and encryption key.

3. The method as in claim 2 further comprising
   a. receiving a request from said application to store an application data file in the application specific data storage volume;
   b. segmenting said application data file into two or more data file segments;

c. copying each of said two or more data file segments in accordance with said received replica count;
d. transmitting at least one copy of said two or more data file segments to a second computer resource module communicatively coupled to said first computer resource module;
e. recording the storage location for each copy of said two more data file segments in a data file log.

4. The method as in claim 3 further comprising
a. receiving a request from a software application for a data file;
b. retrieving said data file log;
c. determining the location of a copy of each of said two or more data file segments from said data file log.

5. The method as in claim 4 further comprising transmitting a copy of each of said two or more data file segments to a client computer.

6. The method as in claim 4 further comprising
a. retrieving a copy of each of two or more data file segments from said one or more memory units of said two or more computer resource modules;
b. combining each retrieved copy of said two or more data file segments into a complete data file.

7. The method as in claim 6 further comprising transmitting said data file to a client computer.

8. The method as in claim 1 further comprising
a. receiving a request from said application to store an application data file in the application specific data storage volume;
b. segmenting said application data file into two or more data file segments;
c. copying each of said two or more data file segments in accordance with a default replica count established in said first computer resource module;
d. encrypting each copy of said two or more data file segments in accordance with a default encryption method and encryption key established in said first computer resource module;
e. transmitting at least one copy of said two or more data file segments to a second computer resource module communicatively coupled to said first computer resource module;
f. recording the storage location for each copy of said two more data file segments in a data file log.

9. The method as in claim 8 further comprising
a. receiving a request from a software application for a data file;
b. retrieving said data file log;
c. determining the location of a copy of each of said two or more data file segments from said data file log.

10. The method as in claim 9 further comprising transmitting a copy of each of said two or more data file segments to a client computer.

11. The method as in claim 9 further comprising
a. retrieving a copy of each of two or more data file segments from said one or more memory units of said two or more computer resource modules;
b. combining each retrieved copy of said two or more data file segments into a complete data file.

12. The method as in claim 10 further comprising transmitting said data file to a client computer.

13. A method for organizing and storing data for a software application comprising
a. on a first computer resource module communicatively coupled to one or more second computer resource modules, said first computer resource module executing a software application
i. wherein said first computer resource module and each of said one or more second computer resource modules comprise an external housing having a top side, a bottom side, a front side, a back side, a left side, and a right side, one or more microprocessor units, one or more nonvolatile memory storage units, one or more transceivers, one or more Ethernet ports
 1. wherein said first computer resource module and each of said one or more second computer resource modules are coupled to a chassis, wherein said chassis comprises a body and one or more Ethernet ports disposed in said body;
 2. wherein each of said one or more Ethernet ports disposed in said first computer resource module and each of said second computer resource modules are communicatively coupled to one or more Ethernet ports in said chassis;
 3. wherein said first computer resource module and said one or more second computer resource modules are communicatively coupled to form a cluster;
 4. wherein a number of computer resource modules within said cluster may be expanded by communicatively coupling additional one or more second computer resource modules to said cluster;
 5. wherein a number of computer resource modules within said cluster may be contracted by disengaging one or more second computer resource modules from communicative coupling with said cluster;
ii. said method comprising
 1. receiving a request from an application for the creation of an application specific data storage volume;
 2. creating an application specific data storage volume stored on one or more memory units of said first computer resource module and respectively on one or more memory units of each of said one or more second computer resource modules;
 3. maintaining said application specific data storage volume after said first computer resource module has terminated the execution of said application;
 4. wherein, in the event said first computer resource module is removed from said cluster or disabled, a complete set of application stored data is available for download from a remaining number of computer resource modules in said cluster;
 5. wherein, in the event one of said one or more second computer resource modules is removed from said cluster or disabled, a complete set of application stored data is available for download from a remaining number of computer resource modules in said cluster;
 6. receiving a request from said application to store an application data file in the application specific data storage volume;
 7. segmenting said application data file into two or more data file segments;
 8. copying, by said first computer resource module, each of said two or more data file segments in accordance with a default replica count established in said first computer resource module, wherein said replica count is a predetermined number;
 9. transmitting, by said first computer resource module, one or more data file segments to one or more of said second computer resource modules;

10. storing said predetermined number of each of said two or more data file segments on said cluster of resource modules;
11. preserving said predetermined number of data file segments across all computer resource modules within a cluster when expanding or contracting said cluster;
12. recording the storage location for each copy of said two more data file segments in a data file log.

14. The method as in claim 13 wherein preserving said predetermined number of data file segments comprises
  a. automatically transmitting one or more data file segments from said first computer resource module to a newly added computer resource module;
  b. automatically transmitting one or more data file segments from said second computer resource module to a newly added computer resource module;
  c. storing said one or more data file segments from said first computer resource module on said newly added computer resource module;
  d. storing said one or more data file segments from said second computer resource module on said newly added computer resource module.

15. The method as in claim 14 wherein preserving said predetermined number of data file segments comprises
  a. determining a second computer resource module has been removed from said cluster;
  b. determining one or more data file segments stored across said cluster with a number of copies less than said predetermined number;
  c. copying one or more determined data file segments until a number of copies of said one or more determined data file segments is equal to said predetermined number.

16. The method as in claim 15 further comprising
  a. receiving a replica count request for data stored in the application specific data storage volume from said application;
  b. receiving a requested storage volume size for said application specific data storage volume from said application;
  c. receiving a persistence request for said application specific data storage volume from said application;
  d. receiving an encryption method from said application;
  e. receiving an encryption key from said application;
  f. encrypting each copy of said two or more data file segments in accordance with said encryption method and encryption key.

17. The method as in claim 16 further comprising
  a. receiving a request from a software application for a data file;
  b. retrieving said data file log;
  c. determining the location of a copy of each of said two or more data file segments from said data file log.

18. The method as in claim 17 further comprising transmitting a copy of each of said two or more data file segments to a client computer.

19. The method as in claim 17 further comprising
  a. retrieving a copy of each of two or more data file segments from said one or more memory units of said two or more computer resource modules;
  b. combining each retrieved copy of said two or more data file segments into a complete data file.

20. The method as in claim 19 further comprising transmitting said data file to a client computer.

* * * * *